United States Patent [19]
Nishigaya et al.

[11] Patent Number: 5,696,900
[45] Date of Patent: Dec. 9, 1997

[54] PERSONAL COMMUNICATION SERVICE DISTRIBUTED CONTROL SYSTEM FOR A NETWORK COMMUNICATION SYSTEM INCLUDING A PLURALITY OF HARDWARE RESOURCES

[75] Inventors: Takashi Nishigaya; Ichiro Iida; Hiroyuki Yamashima, all of Kawasaki; Soichi Kuwahara, Fukuoka, all of Japan

[73] Assignee: Fujitsu Limited, Kanagawa, Japan

[21] Appl. No.: 431,273

[22] Filed: Apr. 28, 1995

[30] Foreign Application Priority Data

Jul. 6, 1994 [JP] Japan .................. HEI 6-125507
Dec. 15, 1994 [JP] Japan .................. HEI 6-312223

[51] Int. Cl.$^6$ .................. H04L 12/00; G06F 13/00
[52] U.S. Cl. .................. 395/200.01; 395/610; 380/25
[58] Field of Search .................. 395/200.15, 650, 395/186, 600, 200.01, 200.02, 800, 610, 187.01; 380/23, 25; 370/58.2, 420; 379/201, 95; 340/825.06, 825.34; 364/514 A

[56] References Cited

U.S. PATENT DOCUMENTS

| | | | |
|---|---|---|---|
| 4,713,806 | 12/1987 | Oberlander et al. | 370/58.2 |
| 4,780,821 | 10/1988 | Crossley | 395/650 |
| 4,922,521 | 5/1990 | Krikke et al. | 379/95 |
| 5,012,511 | 4/1991 | Hanle et al. | 379/211 |
| 5,062,037 | 10/1991 | Shorter et al. | 395/650 |
| 5,202,921 | 4/1993 | Herzberg et al. | 380/23 |
| 5,239,577 | 8/1993 | Bates et al. | 379/201 |
| 5,241,594 | 8/1993 | Kung | 380/4 |
| 5,263,158 | 11/1993 | Janis | 395/600 |
| 5,424,724 | 6/1995 | Williams et al. | 340/825.05 |
| 5,444,848 | 8/1995 | Johnson, Jr. et al. | 395/200.15 |

*Primary Examiner*—Gopal C. Ray
*Attorney, Agent, or Firm*—Helfgott & Karas, P.C.

[57] ABSTRACT

A personal communication service distributed control system provides a personal communication service in a combination of different networks based on the same personal ID without requiring a person originating information to be aware of the type of terminal used by a terminating person. The personal communication service distributed control system includes a plurality of hardware resources. Each of the service control apparatuses includes a plurality of service control program sections, a resource control program section, and a directory control program section. The directory control program section includes a section for referring to a distributed directory in order to perform retrieval for a transfer destination and routing for a control signal simultaneously.

34 Claims, 27 Drawing Sheets

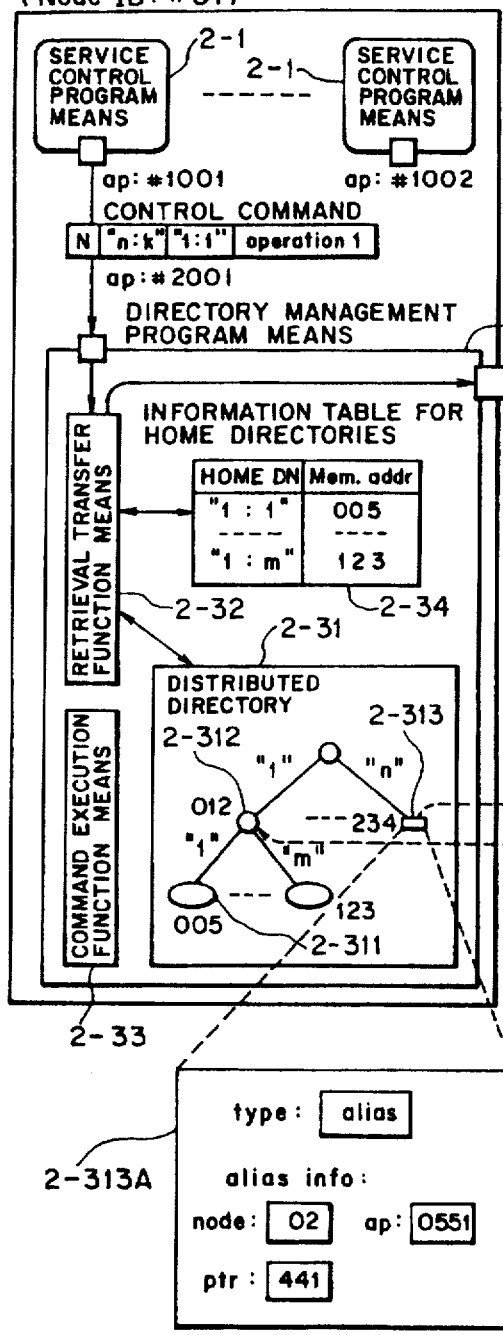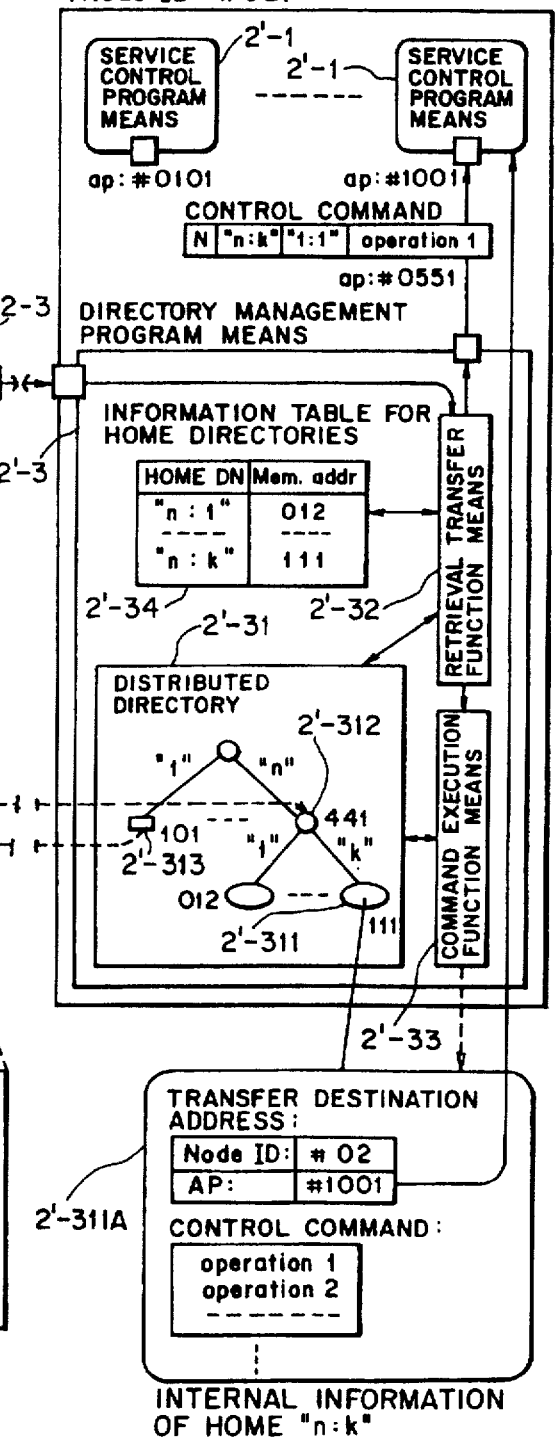

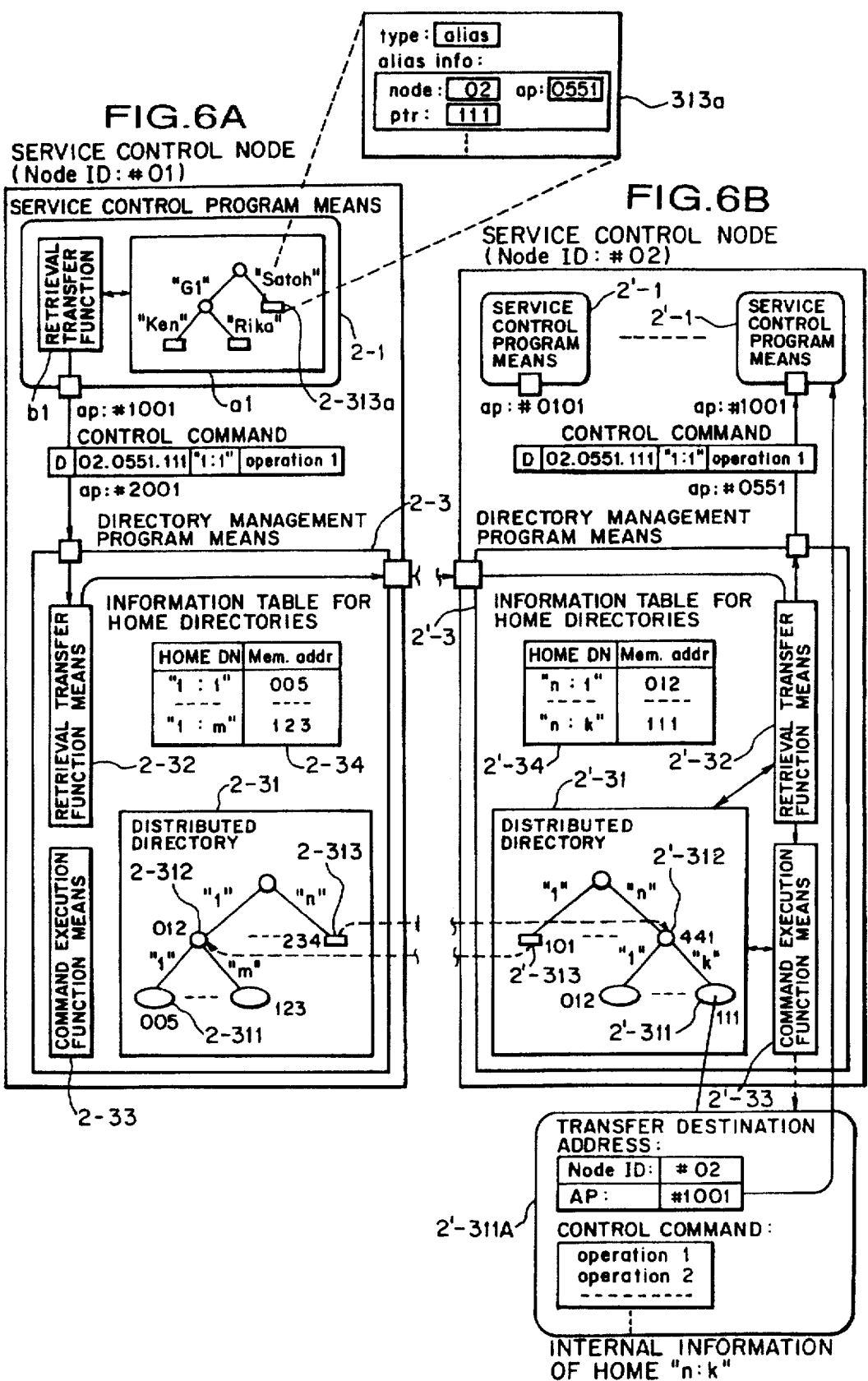

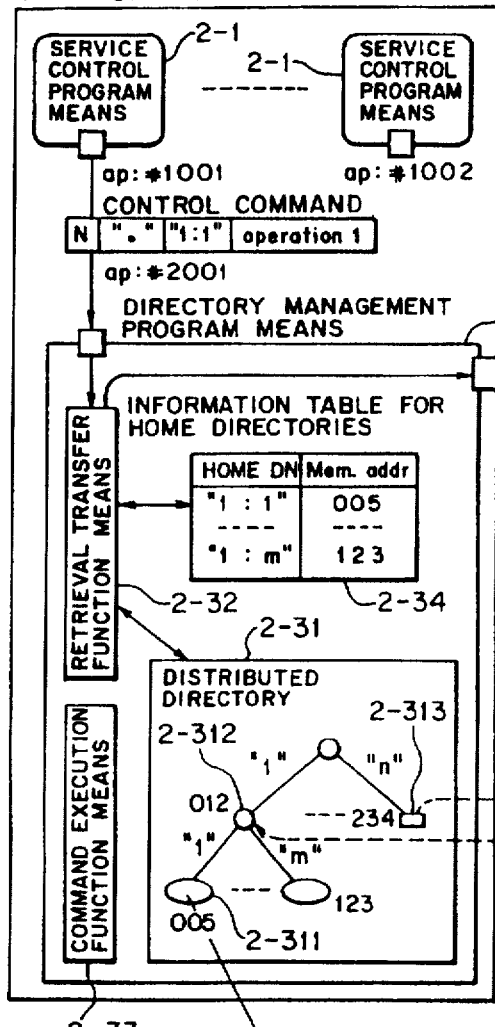
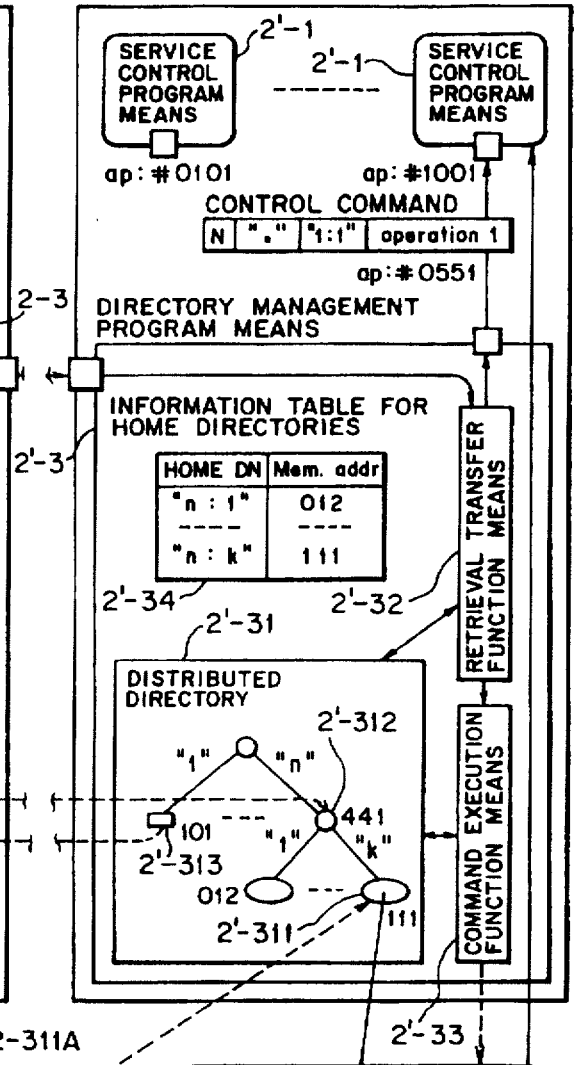
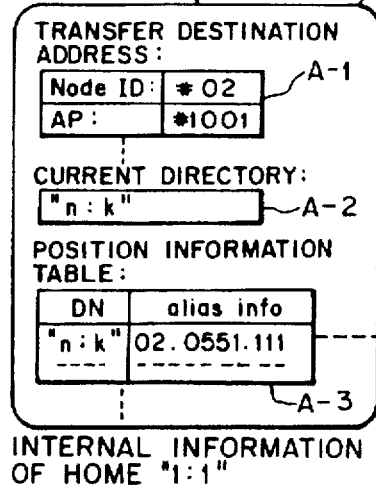
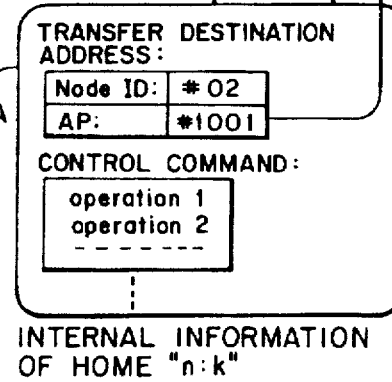
FIG.8A / FIG.8B

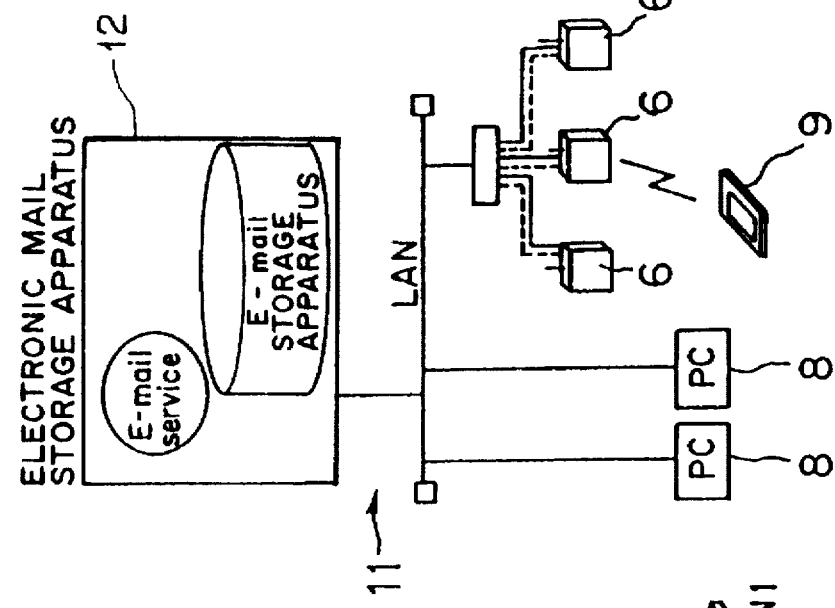
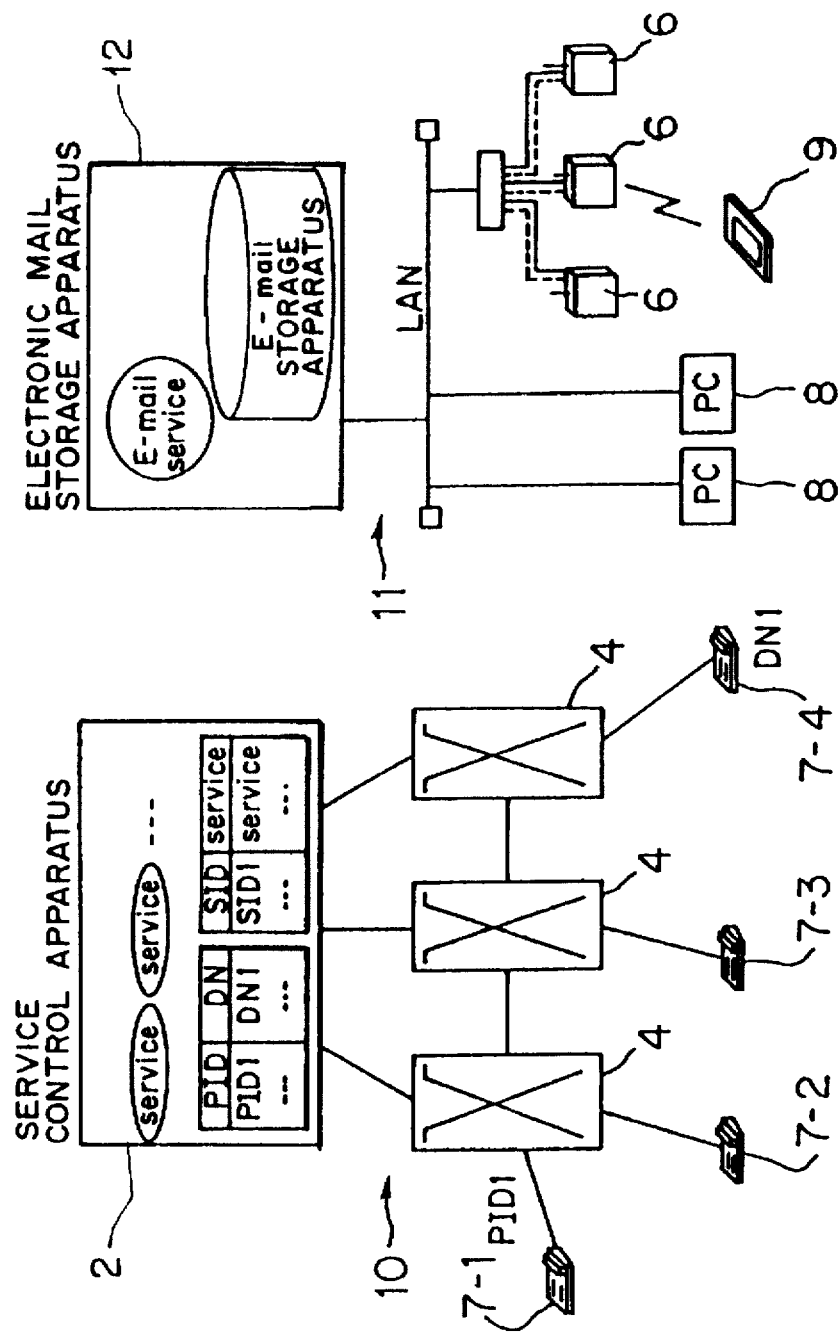

PERSONAL COMMUNICATION SERVICE DISTRIBUTED CONTROL SYSTEM FOR A NETWORK COMMUNICATION SYSTEM INCLUDING A PLURALITY OF HARDWARE RESOURCES

BACKGROUND OF THE INVENTION

1. Field of the Invention

This invention relates to a personal communication service distributed control system wherein service control is performed in a distributed condition in a communication system which performs personal ID services defined for individual users using personal identification information (a personal identification number or a like identifier may be hereinafter referred to as personal ID) for identification of the users.

2. Description of the Related Art

The present invention is directed to a personal communication system by which origination and termination of a telephone call or transmission and reception of a facsimile or an electronic mail can be performed based on a personal ID by way of a communication terminal such as a fixed telephone set, a portable telephone set, a personal computer or a portable personal information control equipment by means of which radiocommunication can be performed. Here, registration of a terminal of a user may be performed by any method including automatic position registration based on a radio ID card, inputting of a personal ID to a terminal and insertion into a communication terminal of a magnetic card or an IC card in which a personal ID is written, and does not limit a user to use a plurality of different terminals depending upon the case.

Further, the present invention is directed to a service which can be enjoyed, even where an addresser and an addressee utilize terminals or networks of different types for communication, by way of such different networks. Typically, for example, when a telephone call is originated to a user who makes use of a portable information terminal, such a communication service may possibly be performed as to convert speech into a text making use of a speech recognition apparatus in a network to produce an electronic mail and send the electronic mail to the portable terminal by way of a radio base station in an area in which the object user is present.

Furthermore, the present invention is directed to a system which allows such personal communication services of a combination of different networks to be customized personally for different individuals.

FIGS. 25(a) and 25(b) show different examples of a personal ID communication system. Personal ID communication systems which are available at present include such a system of the type which is directed principally to telephone services as shown in FIG. 25(a) in which the system is generally denoted at 10, and such a system of the type which is directed to electronic mails as shown in FIG. 25(b) in which the system is generally denoted at 11.

Referring first to FIG. 25(a), the personal communication service system 10, which is directed to telephone services, generally includes a plurality of hardware components including a plurality of telephone sets 7-1 to 7-4 and a plurality of exchange apparatus 4 which form a physical network, and a service control apparatus 2 for controlling the physical network (hardware components). In the system of the construction, a correspondence table 21 between a personal ID (PID) allocated to a user and a telephone number or numbers (DN or DNs) of a terminal or terminals registered for termination by the user is constructed in the service control apparatus 2 connected to the exchange apparatus 4, and a personal ID (for example, PID1) inputted, for example, from the terminal 7-1 by an originating person is converted into a telephone number (for example, DN1) of a transfer destination by the service control apparatus 2 so that any telephone call may be terminated normally with the same personal number wherever the originating person is where a telephone set is installed.

Referring now to FIG. 25(b), the personal communication service system 11, which is directed to electronic mails, includes a plurality of PC (personal computer) terminals 8 and a plurality of radio base stations 6 which form a physical network, and an electronic mail storage apparatus 12 for controlling the physical network. In the system, a terminal used by a user who utilizes the system is connected to a host machine for mail services by way of a LAN (Local Area Network) or a telephone line using a personal ID which has no particular relation to the terminal used by the user so as to allow transmission or reception of an electronic mail from or to a personal computer or a like terminal. Some of the personal communication service systems of the type mentioned are constructed such that an electronic mail can be communicated without the necessity of a network connection procedure from or to a portable information terminal 9 having a radio modem by way of a radio base station 6 for exclusive use for the portable information terminal 9.

While various communication media can be utilized for communications between individual users as in personal ID communication services such as telephone services and electronic mailing services described above, since networks which can be utilized by the services have been developed independently of one another, they have a subject to be solved in that services of different networks cannot be utilized readily, for example, in that, when a user of a telephone service wants to transmit information to a user of an electronic mailing system, although the other party is the same, the connection procedure or the personal ID of the other party may be different depending upon the medium utilized for communication.

Further, the various communication services mentioned hereinabove are merely utilized by designating, by a user, a specific number allocated to a ready-made service prepared by a person who offers a network, and the user itself cannot define a personal communication service for the individual user.

A possible solution to the subjects may be to construct a network in which such a telephone network and an information network as described above are combined. In this instance, in order to retrieve the telephone network and the information network for a hardware resource which provides a particular service, such a distributed directory data base system 13 as shown in FIG. 26 is used.

In the distributed directory data base system 13, in order to transmit information from a certain service control apparatus 14-1 to another service control apparatus 14-3, a service program SP in the service control apparatus 14-1 first requests retrieval transfer function means 16 of a distributed directory system 18 for retrieval in order to find out the position of the service control apparatus 14-3. Then, the distributed directory system 18 performs such retrieval and transmits a result of the retrieval to the service control apparatus 14-1 from which the request for retrieval has developed, and then performs routing for information transmission to the object service control apparatus 14-3. It is to be noted that also reference numeral 14-2 in FIG. 26 denotes a service control apparatus.

The distributed directory data base system 13 further includes a plurality of data bases 17 each of which has, as shown in FIG. 27, a data structure of a tree structure wherein a plurality of storage areas (directories) for storing information of terminals and/or individuals are linked bi-directionally by way of pointers. In order to retrieve a particular piece of information, retrieval is performed stage by stage in a lower stage direction from a route 19 of the tree structure, and if the desired information cannot be discovered even when the retrieval is performed at the last stage, another one of the data bases 17 is retrieved in a similar procedure.

In this instance, however, since a very great amount of hardware resources available for communication services are involved, data bases for retrieval for a hardware resource which provides a particular service are essentially required.

Further, if retrieval for a hardware resource is performed using such distributed directory data base system 13 as shown in FIG. 26, then if information of a desired hardware resource is not obtained even when a certain data base 17 is retrieved from the first stage (root 19) to the last stage thereof, then since retrieval of another data base 17 is performed again beginning with the first stage of it, the efficiency is very low and much time is required for the retrieval. Accordingly, there is a subject to be solved in that transmission of information is delayed.

Further, since also the network which transmits information of a user is distributed as described above, control of the network requires a procedure of two steps including retrieval for a hardware resource and subsequent routing for transmission of information, and consequently, transmission of information is delayed similarly, which is not efficient.

Furthermore, while the service programs SP which control execution of various personal communication services are provided in a distributed condition in the different service control apparatus 14-1 to 14-3 as seen in FIG. 26 and also operation positions are fixed in the service control apparatus 14-1 to 14-3, since a communication terminal and a communication network to be utilized are switched each time a user moves, even if signal transmission is performed efficiently with any of the service control apparatus 14-1 to 14-3, if a communication network to be used after the user moves and a service program SP which has operated before the user moves are geographically spaced away from each other, then a delay in execution of a service by signal transfer between service control apparatus (for example, between the service control apparatus 14-1 and the service control apparatus 14-3) cannot be avoided, which is a further subject to be solved.

SUMMARY OF THE INVENTION

It is an object of the present invention to provide a personal communication service distributed control system wherein different networks such as, for example, a telephone personal number communication service system and an electronic mailing system are combined with each other to realize a personal communication service by a combination of different networks based on a same personal ID without causing an originating person of information to get aware of a type of a terminal used by a terminating person.

It is another object of the present invention to provide a personal communication service distributed control system which allows a user itself to define a communication service for exclusive use for the individual user based on a personal ID and can realize a distributed processing system which involves a reduced delay time when a plurality of networks are controlled based on the thus defined communication service.

It is a further object of the present invention to provide a personal communication service distributed control system wherein a service control program in a service control apparatus corresponding to a user is moved as the user moves so as to allow a high speed personal communication service to be performed even when the user moves.

In order to attain the objects described above, according to an aspect of the present invention, there is provided a personal communication service distributed control system for a communication system wherein a personal identification information service defined for each user is performed using personal identification information for identification of the user, comprising a plurality of hardware resources constituting a physical network, and a plurality of service control apparatus connected to the hardware resources, each of the service control apparatus including a plurality of service control program means for controlling the physical network independently of each other for individual pieces of personal identification information, resource control program means for controlling the hardware resources present discretely in the physical network, and directory control program means including a distributed directory for uniquely identifying the service control program means, the resource control program means and the hardware resources, transfer destination retrieval function means and transfer function means for a control signal, and means for referring to the distributed directory to perform retrieval for a transfer destination of and routing for the control signal simultaneously.

With the personal communication service distributed control system, there is an advantage in that it can perform a personal communication service for exclusive use for an individual by way of a combination of different networks without a delay.

According to another aspect of the present invention, there is provided a personal communication service distributed control system for a communication system wherein a personal identification information service defined for each user is performed using personal identification information for identification of the user, comprising a plurality of hardware resources constituting a physical network, and a plurality of service control apparatus connected to the hardware resources, each of the service control apparatus including a plurality of service control program means for controlling the physical network independently of each other for individual pieces of personal identification information, resource control program means for controlling the hardware resources present discretely in the physical network, and directory control program means including a distributed directory for uniquely identifying the service control program means, the resource control program means and the hardware resources, a personal identification information directory for identifying the service control program means for the individual users, a resource directory for identifying the hardware resources, an area directory for identifying physical positions of the users and the hardware resources, and movement management means operable when a user or a communication terminal which can access any of the hardware resources moves for varying the area directory and moving the service control program means of the user or the communication terminal.

With the personal communication service distributed control system, there is an advantage in that a personal communication service for exclusive use for an individual by way of a combination of different networks can be performed without a delay even if the user moves to any position.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 5 is a diagrammatic view illustrating an example of transfer of a control message by directory control program means of the personal communication service distributed control system of FIG. 3;

FIG. 6 is a diagrammatic view illustrating an example of transfer of a control message based on a personal directory for exclusive use in the inside of the service control program means shown in FIG. 4;

FIG. 8 is a diagrammatic view illustrating an example of transfer of a control message when an abbreviation mark of a current directory is used for a destination in the personal communication service distributed control system of FIG. 3;

FIG. 25(a) is a diagrammatic view showing a personal ID communication system directed to telephone services, and FIG. 25(b) is a similar view but showing another personal ID communication system directed to electronic mails;

DESCRIPTION OF THE PREFERRED EMBODIMENTS a. Aspects of the Invention

First, aspects of the present invention will be described with reference to FIGS. 1 and 2.

Figure 1:
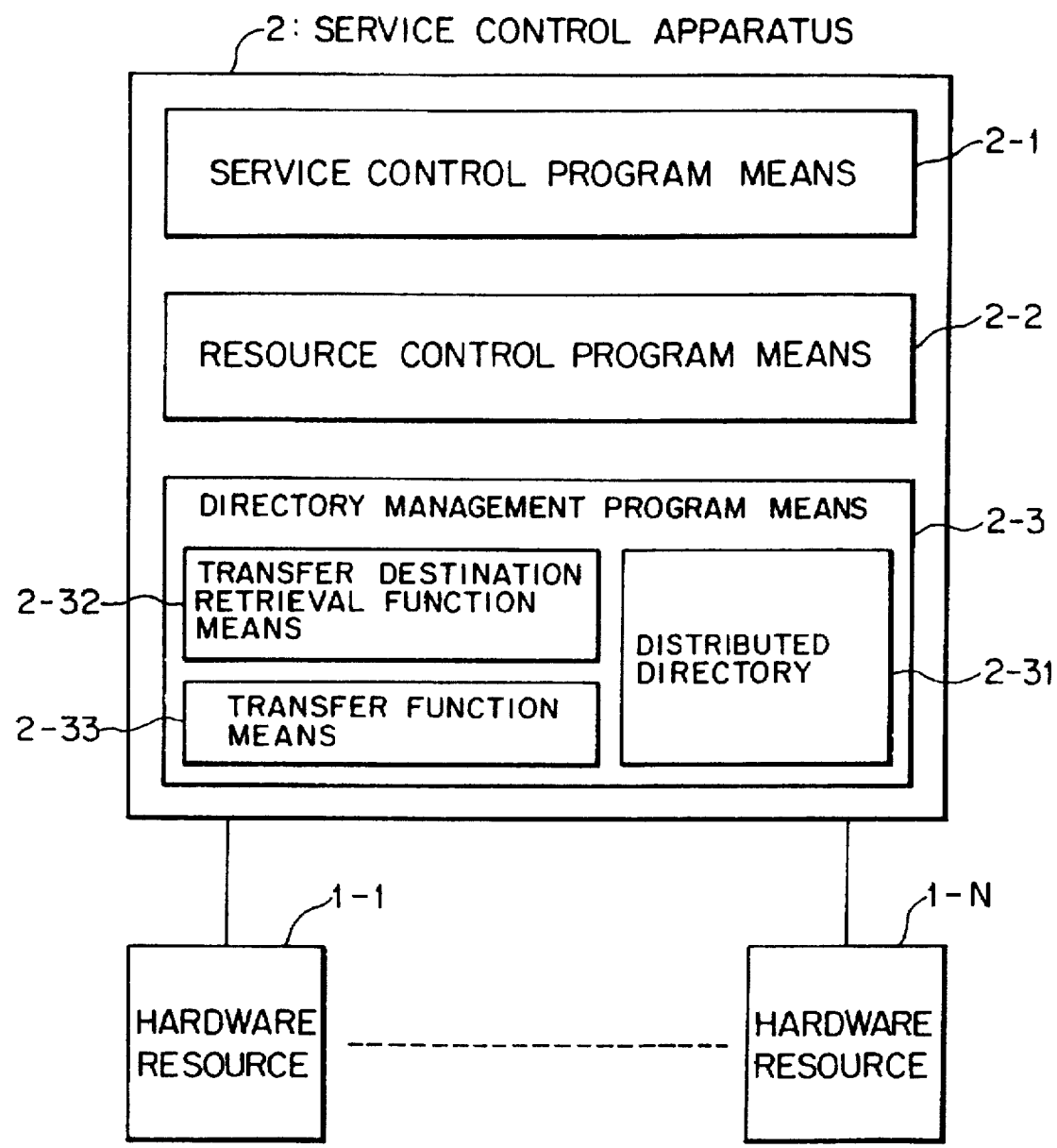
FIGS. 1 and 2 are block diagrams illustrating different aspects of the present invention.

Referring first to FIG. 1, there is shown in block diagram a personal communication service distributed control system according to an aspect of the present invention. The personal communication service distributed control system is applied to a communication system wherein a personal identification information service defined for each user is performed using personal identification information for identification of the user.

The personal communication service distributed control system includes a plurality of hardware resources 1-1 to 1-N constituting a physical network, and a plurality of service control apparatus 2 connected to the hardware resources 1-1 to 1-N. Each of the service control apparatus 2 includes a plurality of service control program means 2-1 for controlling the physical network independently of each other for individual pieces of personal identification information, resource control program means 2-2 for controlling the hardware resources 1-1 to 1-N present discretely in the physical network, and directory control program means 2-3.

The directory control program means 2-3 includes a distributed directory 2-31 for uniquely identifying the service control program means 2-1, the resource control program means 2-2 and the hardware resources 1-1 to 1-N, transfer destination retrieval function means 2-32 for retrieving for a transfer destination of a control signal, and transfer function means 2-33 for transferring a control signal.

Further, the directory control program means 2-3 is constructed so as to refer to the distributed directory 2-31 to perform retrieval for a transfer destination of and routing for a control signal simultaneously.

In the personal communication service distributed control system of the construction described above which is applied to a communication system wherein a personal identification information service defined for each user is performed using personal identification information for identification of the user, each of the service control program means 2-1 controls the physical network independently of each other for individual pieces of personal identification information, and the resource control program means 2-2 controls the hardware resources 1-1 to 1-N present discretely in the physical network.

Further, the directory control program means 2-3 in the service control apparatus 2 uniquely identifies, by means of the distributed directory 2-31 therein, the service control program means 2-1, the resource control program means 2-2 and the hardware resources 1-1 to 1-N, and retrieves, by means of the transfer destination retrieval function means 2-32 therein, for a transfer destination of a control signal, and then transfers, by means of the function means 2-33 thereof, the control signal. As a result, the directory control program means 2-3 can refer to the distributed directory 2-31 to perform retrieval for a transfer destination of and routing for a control signal simultaneously.

Accordingly, with the personal communication service distributed control system just described, there is an advantage in that it can perform a personal communication service for exclusive use for an individual by way of a combination of different networks without a delay.

The distributed directory 2-31 may be constructed using a home directory for holding position information of the service control program means 2-1 or the resource control program means 2-2 and an alias directory for holding information of a connection relationship of the divided directories.

In this instance, since the home directory of the distributed directory 2-31 holds position information of the service control program means 2-1 or the resource control program means 2-2 and similarly the alias directory holds information of a connection relationship of the divided directories, the directory control program means 2-3 can refer to the distributed control program means 2-31 to perform retrieval for a transfer destination of and routing for a control signal simultaneously. Accordingly, there is an advantage in that also retrieval of the resource control program means 2-2 which are present discretely can be performed at a high speed.

The personal communication service distributed control system may be constructed such that each of the service control program means 2-1 includes a personal identification information directory for allowing another piece of personal identification information of the user to be defined newly, and means for using a directory name of the re-defined personal identification information for a reception side address for communication between programs to allow the directory control program means 2-3 to perform routing of the control signal without retrieving the distributed directory 2-31.

In this instance, another piece of personal identification information of the user can be defined newly by means of the personal identification information directory of each of the service control program means 2-1, and by using a directory name of the re-defined personal identification information for a reception side address for communication between programs, the directory control program means 2-3 can perform routing for a control signal without retrieving the distributed directory 2-31.

Accordingly, with the personal communication service distributed control system of the construction just described, there is an advantage in that a service of media of a combination of different types of networks can be utilized using a same personal ID irrespective of media to be used.

The personal communication service distributed control system may be constructed such that the directory control program means 2-3 of the service control apparatus 2 includes a correspondence table between home directory names of the service control program means 2-1 and the resource control program means 2-2 present in the same service control apparatus 2 and position information of the directories, and means operable when a request for transfer of a message for communication between programs is received for causing the directory control program means 2-3 to refer to the correspondence table and perform high speed communication between programs without performing directory retrieval from a root of the directory to the home directory when a reception side address coincides with a name of a home directory of the service control program means or the resource control program means or includes an abbreviation mark representative of a transmission side home directory.

In this instance, the correspondence table of the directory control program means 2-3 of the service control apparatus 2 stores home directory names of the service control program means 2-1 and the resource control program means 2-2 present in the same service control apparatus and position information of the directories.

Then, when a request for transfer of a message for communication between programs is received, the directory control program means 2-3 refers to the correspondence table. Consequently, when a reception side address coincides with a name of a home directory of the service control program means 2-1 or the resource control program means 2-2 or includes an abbreviation mark representative of a transmission side home directory, the directory control program means 2-3 can perform high speed communication between programs without performing directory retrieval from a root of the directory to the home directory.

Accordingly, with the personal communication service distributed control system of the construction just described, there is an advantage in that, since an abbreviation mark representative of a home directory can be included in a transmission destination address, the amount of header information of a control message can be reduced and hence the controlling traffic can be reduced.

The personal communication service distributed control system may be constructed such that a home directory of the directory control program means 2-3 of the service control apparatus 2 has a storage area for a current directory name which indicates a start point of retrieval and a storage area for position information of the current directory, and means operable when an abbreviation mark representative of the current directory is included in a designation of a reception side address for communication between programs for causing the directory control program means 2-3 to refer to the correspondence table of the home directory and the position information of the current directory and perform high speed communication between the programs without performing directory retrieval from a root of the directory to the current directory.

In this instance, the storage areas of the directory control program means 2-3 of the service control apparatus 2 store a current directory name which indicates a start point of retrieval in the home directory and store position information of the current directory.

Then, when a request for transfer of a message for communication between programs is received, the directory control program means 2-3 refers to the correspondence table and the position information of the current directory, and when an abbreviation mark representative of the current directory is included in a designation of a reception side address for communication between programs, the directory control program means 2-3 performs high speed communication between the programs without performing directory retrieval from a root of the directory to the current directory.

Accordingly, with the personal communication service distributed control system of the construction just described, there is an advantage in that, since an abbreviation mark representative of a current directory can be included in a transmission destination address, the amount of header information of a control message can be reduced and hence the controlling traffic can be reduced.

The personal communication service distributed control system may be constructed such that the directory control program means 2-3 includes an object as a storage area for storing states of communication terminals which can access the hardware resources 1-1 to 1-N, and a directory for identification names peculiar to the communication terminals, and each of the service control program means 2-1 has a storage area for storing a list of the peculiar identification names of the terminals used by the user, and that management of the position of any of the communication terminals is performed by variation of an area directory in the directory control program means 2-3 whereas user registration control of the terminals is performed by the service control program means 2-3.

In this instance, the object as a storage area of the directory management program means 2-3 stores states of communication terminals which can access the hardware resources 1-1 to 1-N, and the area directory stores areas in which the communication terminals are present.

Then, the storage area of each of the service control program means 2-1 stores a list of the peculiar identification names of the terminals used by the user, and the directory control program means 2-3 performs management of the position of any of the communication terminals by variation of the area directory. Further, the service control program means 2-1 performs control of registration of the terminals of the user. Consequently, position control of different types of communication terminals and user registration control can be performed.

Accordingly, with the personal communication service distributed control system of the construction just described, there is an advantage in that user registration and position information management of a terminal can be performed effectively, and as a result, a personal communication service for exclusive use for an individual by way of a combination of different networks can be performed without a delay.

Or, the personal communication service distributed control system may be constructed such that the directory control program means 2-3 has a storage area provided in each of objects thereof for storing information of an event notification requirement and has a storage area provided in a home directory of the object for storing a correspondence table between an event notification destination home directory name and position information of the event notification destination home directory, and includes means for referring to the notification requirement of the object and the correspondence table and performing notification of the event after the state of the object is updated in order to realize notification reservation of the object state variation event to the particular object in the directory control program means 2-3.

In this instance, the storage areas of each of the objects in the directory control program means 2-3 store information of an event notification requirement and further store a correspondence table between an event notification destination home directory name and position information of the event notification destination home directory. In order to realize notification reservation of the object state variation event to the particular object, the notification requirement of the object and the correspondence table are referred to and notification of the event is performed after the state of the object is updated.

Accordingly, with the personal communication service distributed control system of the construction just described, there is an advantage in that, since the resource control program means 2-2 does not perform processing with an event notification taken into consideration, an event notification can be provided with a reduced delay, which can provide flexibility to a personal communication service for exclusive use for an individual handled by the service control program means 2-1.

Further, the personal communication service distributed control system may be constructed such that each of the directories of the directory control program means 2-3 has a storage area for storing information of an event notification requirement and a home directory above the directory or a root directory has a storage area for storing a correspondence table between names and position information of event notification destination home directories, and in order to realize reservation of notification of an object state variation event to all of objects present under a particular directory in the directory control program means 2-3, the directory control program means 2-3 includes means for referring to the home directory of the object, the notification requirements of the root directory and the correspondence table and performing notification of the event after the state of the object is updated.

In this instance, the storage area of each of the directories of the directory control program means 2-3 stores information of an event notification requirement and the storage area of the home directory above the directory or the root directory stores a correspondence table between names and position information of event notification destination home directories.

Then, in order to realize reservation of notification of an object state variation event to all of objects present under a particular directory, the home directory of the object, the notification requirements of the root directory and the correspondence table are referred to and notification of the event is performed after the state of the object is updated.

Accordingly, with the personal communication service distributed control system of the construction just described, reservation of notification of an object state variation event to all of objects present under a particular directory in the directory control program means 2-3 can be performed to the home directory above the directory or the root direction. Consequently, there is an advantage in that the resource control program means does not perform processing with an event notification taken into consideration and notification of an event can be performed with a reduced delay. Also there is another advantage in that flexibility can be provided to a personal communication service for exclusive use for an individual handled by the service control program means.

Figure 2:
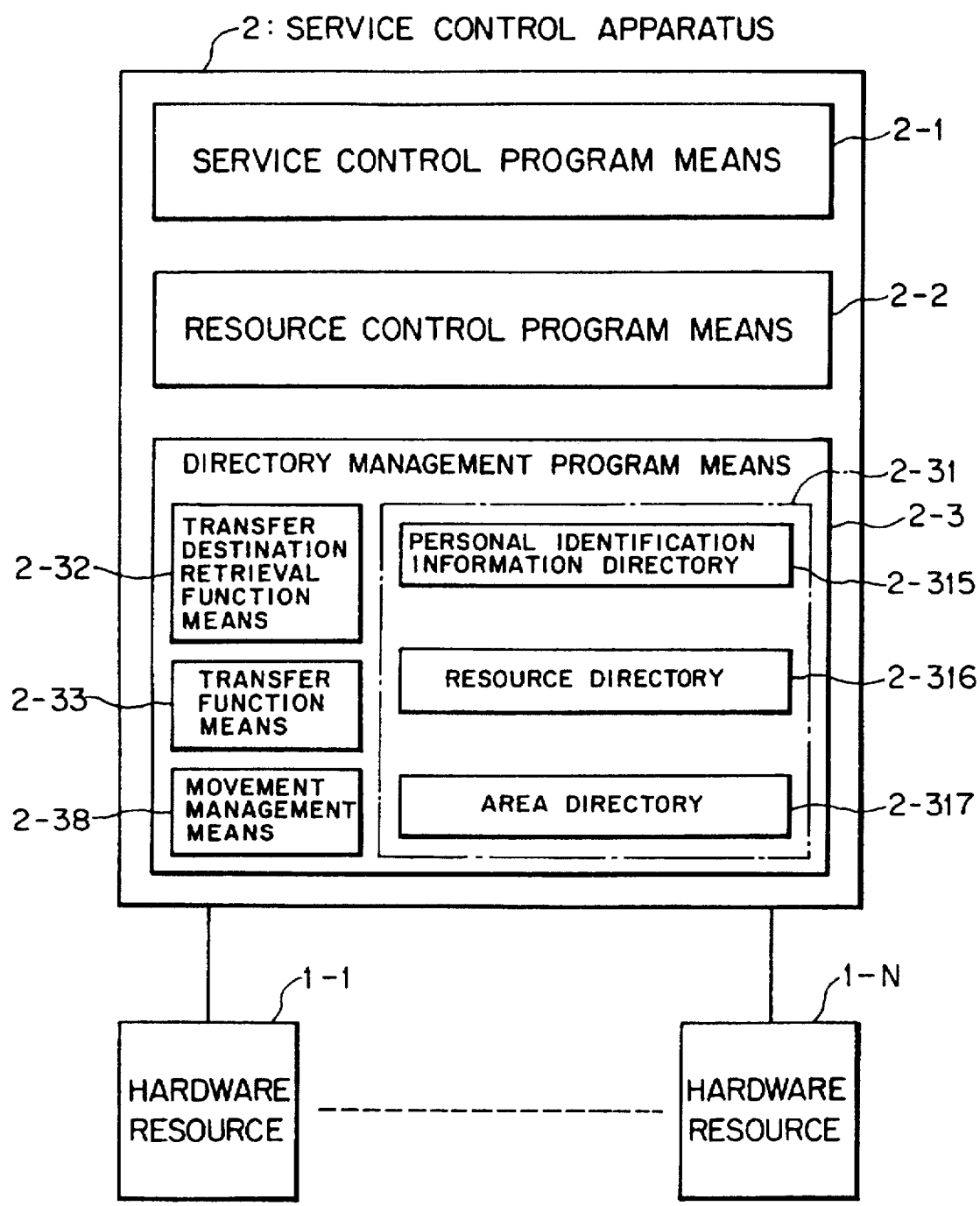

Referring now to FIG. 2, there is shown in block diagram a personal communication service distributed control system according to another aspect of the present invention. Also the present personal communication service distributed control system includes a plurality of hardware resources 1-1 to 1-N and a plurality of service control apparatus 2 connected to the hardware resources 1-1 to 1-N, all similar to those described hereinabove with reference to FIG. 1. Each of the service control apparatus 2 includes a plurality of service control program means 2-1 and resource control program means 2-2, which are all similar to those described hereinabove with reference to FIG. 1, and further includes directory control program means 2-3.

The directory control program means 2-3 includes, in addition to a distributed directory 2-31, transfer destination retrieval means 2-32 and transfer function means 2-33 which are similar to those described hereinabove with reference to FIG. 1, a personal identification information directory 2-315, a resource directory 2-316 for identifying the hardware resources, an area directory 2-317, and movement management means 2-38.

The personal identification information directory 2-315 identifies the service control program means 2-1 for the individual users. The resource directory 2-316 identifies the hardware resources 1-1 to 1-N. The area directory 2-317 identifies physical positions of the users and the hardware resources 1-1 to The movement management means 2-38 performs, when a user or a communication terminal which can access any of the hardware resources 1-1 to 1-N moves, variation of the area directory 2-317 and movement of the service control program means 2-1.

In the personal communication service distributed control system of the construction described above, each of the service control program means 2-1 in the service control apparatus 2 controls the physical network independently of each other for individual pieces of personal identification information, and the resource control program means 2-2 controls the hardware resources 1-1 to 1-N present discretely in the physical network.

Then, in the service control apparatus 2, the distributed directory 2-31 of the directory control program means 2-3 uniquely identifies the service control program means 2-1, the resource control program means 2-2 and the hardware resources 1-1 to 1-N, and the transfer destination retrieval function means 2-32 retrieves for a transfer destination of a control signal. Further, the function means 2-33 transfers the control signal to the transfer destination found out by the transfer destination retrieval function means 2-32.

In this instance, since, particularly in the directory control program means 2-3, the personal identification information directory 2-315 can identify the service control program means 2-1 for the individual users and the resource directory 2-316 can identify the hardware resources 1-1 to 1-N and besides the area directory 2-317 can identify physical positions of the users and the hardware resources 1-1 to 1-N, when a user or a communication terminal which can access any of the hardware resources 1-1 to 1-N moves, variation of the area directory 2-317 and movement of the service control program means 2-1 can be performed without a delay by the movement management means 2-38 irrespective of the physical positions of the user and the hardware resources 1-1 to 1-N.

Accordingly, with the personal communication service distributed control system of the construction just described, there is an advantage in that a personal communication service can be performed with a reduced delay to whichever position the user moves.

The service control program means 2-1 may include a memory for storing an area directory name representative of a position of the service control program means 2-1 after its movement. In this instance, the service control program means 2-1 is constructed such that it successively updates the memory and uses a relative address of the area directory 2-317 when the service control program means 2-1 tries to get information of the area directory 2-317 or transmit a control signal to an object as a storage area for storing a state of the communication terminal.

Consequently, in the personal communication service distributed control system just described, a relative address of the area directory 2-317 can be used when the service control program means 2-1 tries to get information of the area directory 2-317 or transmit a control signal to an object as a storage area for storing a state of the communication terminal.

Accordingly, with the personal communication service distributed control system just described, there is an advantage in that a control signal can be transmitted at a high speed without by way of a plurality of service control apparatus 2.

Further, the area directory 2-317 of the directory control program means 2-3 may have a copy of a home object as a storage area for storing a physical position of the service control program means 2-1. In this instance, the resource control program means 2-2 is constructed such that it uses a relative address of the area directory 2-317 when the resource control program means 2-2 transmits a control signal to the service control program means 2-1.

Consequently, when the resource control program means 2-2 transmits a control signal to the service control program means 2-1, a relative address of the area directory 2-317 can be used.

Accordingly, with the personal communication service distributed control system just described, there is an advantage in that a control signal can be transmitted at a high speed without by way of a plurality of service control apparatus 2.

Further, the personal identification information directory 2-315 may have a cache area serving as a memory for storing data of the personal identification information of the service control apparatus 2. In this instance, the directory control program means 2-3 includes means for moving, when the service control program means 2-1 moves between the service control apparatus 2 and another service control apparatus, the personal identification information and a copy of the home object of the service control program means 2-1 between the service control apparatus into the cache area and for preferentially retrieving the cache area when a control signal is to be transmitted between the service control program means 2-1 and another service control program means.

Consequently, when the service control program means 2-1 moves between the service control apparatus 2 and another service control apparatus, the personal identification information and a copy of the home object of the service control program means 2-1 can be moved between the service control apparatus into the cache area. Further, when a control signal is to be transmitted between the service control program means 2-1 and another service control program means, the cache area is preferentially retrieved. Consequently, the control signal can be transmitted at a high speed.

Accordingly, with the personal communication service distributed control system just described, there is an advantage in that a control signal can be transmitted at a high speed without by way of a plurality of service control apparatus 2.

Further, the copy of the home object of the resource control program means 2-2 which is referred to by both of the area directory 2-317 and the cache area may be constructed as a common memory. By the construction, both of the area directory 2-317 and the cache directory can refer to the memory, and distributed control of a personal communication service can be performed without a delay.

Accordingly, with the personal communication service distributed control system just described, there is an advantage in that the memory area necessary for a copy of a home object can be reduced remarkably and a control signal can be transmitted at a high speed.

Further, each of the service control program means 2-1 may have a movement permission information storage area for setting permission or inhibition of movement of the service control program means 2-1 in advance. In this instance, the service control program means 2-1 determines permission or inhibition of movement of the service control program means 2-1 based on the setting in the movement permission information storage area.

Consequently, with the personal communication service distributed control system just described, since permission or inhibition of movement of the service control program means can be determined based on the setting in the movement permission information storage area, movement of the service control program means can be performed only when such movement is required.

The personal communication service distributed control system may be constructed such that each of the service control program means 2-1 has a movement delay time setting section and movement of the service control program means 2-1 is delayed based on the setting of the movement delay time setting section.

Consequently, with the personal communication service distributed control system just described, since movement of the service control program means 2-1 can be delayed based on the setting of the movement delay time setting section, movement of the service control program means can be performed only when such movement is required.

Accordingly, with the personal communication service distributed control system just described, since useless movement of the service control program means 2-1 can be reduced remarkably with regard to a communication terminal of a user who moves frequently, a personal communication service can be performed at a higher speed.

b. First Embodiment of the Invention

Figure 3:
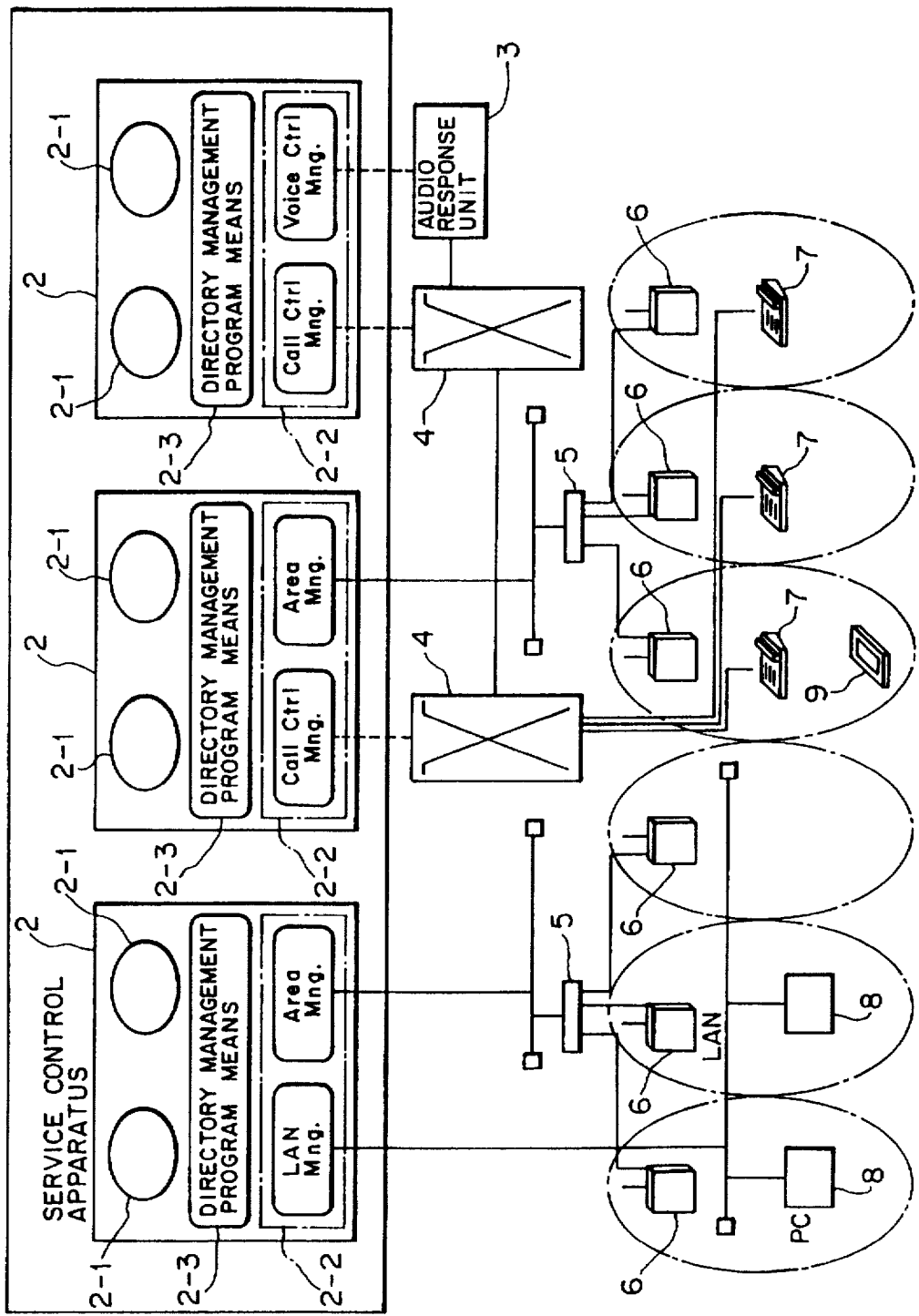
FIG. 3 is a block diagram of a personal communication service distributed control system showing a first preferred embodiment of the present invention.

Referring now to FIG. 3, there is shown a personal communication service distributed control system according to a first preferred embodiment of the present invention. The system shown is generally constructed such that a personal ID service defined for each user is performed using a personal ID for identification of the user, and includes a speech response apparatus 3, a pair of exchange apparatus 4, a pair of concentrators 5, a plurality of radio base stations 6, a plurality of telephone sets 7 and a plurality of personal computers (PC) 8 all serving as hardware resources which constitute a physical network, and three service control apparatus 2 connected to the hardware resources. It is to be noted that a portable information terminal 9 in FIG. 3 is not connected directly to any of the service control apparatus 2 but communicates information by way of one of the radio base stations 6.

Further, each of the service control apparatus 2 includes a pair of service control program means 2-1 resource control program means 2-2, and directory control program means 2-3.

The service control program means 2-1 control the physical network independently of each other for individual personal IDs. The resource control program means 2-2 controls the hardware resources 3 to 9 present discretely in the physical network.

To this end, the resource control program means 2-2 includes a program (LAN Mng) for controlling a LAN, another program (Area Mng) for controlling the positions of the hardware resources 3 to 9, a further program (Call Ctrl Mng) for controlling an exchange apparatus 4, or a still further program (Voice Ctrl Mng) for controlling the speech response apparatus 3.

Each of the directory control program means 2-3 uniquely identifies the corresponding service control program means 2-1, the corresponding resource control program means 2-2 and the hardware resources 3 to 9 and performs retrieval of a transfer destination of and routing for a control message simultaneously in order to control any of the physical network and the hardware resources 3 to 9.

In this manner, networks of a telephone personal number communication service and an electronic mailing system which have been developed independently of each other to this date can be combined with each other, and an originating person of information can utilize a personal ID communication service of the different types of networks readily without getting aware of a type of a terminal utilized by a terminating person.

Here, the directory control program means 2-3 and the service control program means 2-1 described above will be described in more detail with reference to FIGS. 16 and 4, respectively.

Figure 16:
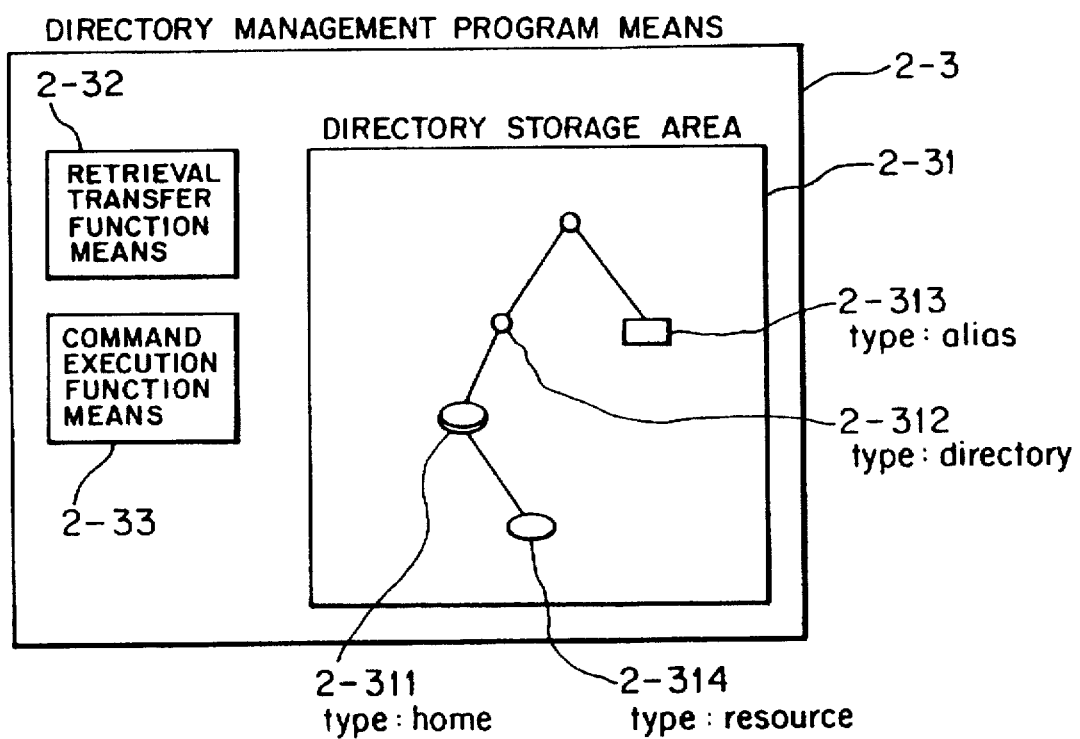
FIG. 16 is a block diagram showing an example of the internal construction of the directory control program means employed in the personal communication service distributed control system of FIG. 3.

FIG. 16 shows an example of the internal construction of the directory control program means 2-3. Referring to FIG. 16, the directory control program means 2-3 shown includes a storage area (hereinafter referred to as distributed directory) 2-31 for storing directories, retrieval transfer function means 2-32 for retrieving the distributed directory 2-31 and transferring a control signal, and command execution function means 2-33 for updating information in the distributed directory 2-31.

The distributed directory 2-31 has a data structure wherein objects of four kinds of directories (directory, alias, home, and resource) are linked by way of bi-directional pointers.

The object of the directory 2-312 whose type is "directory" is used to form a tree structure and is linked to 0 or more other objects by way of pointers. The object of the directory (alias directory) 2-313 whose type is "alias" stores position information for reference to other objects. It is to be noted that, since the "alias" object can refer to objects present in any other directory control program means 2-3, a distributed directory can be constructed from a plurality of directory control program means 2-3.

Meanwhile, the object of the directory (home directory) 2-311 whose type is "home" stores address information for transferring a control signal to any of the service control program means 2-1 and the resource control program means 2-2 described hereinabove with reference to FIG. 3, and the object of the directory (resource directory) 2-314 whose type is "resource" stores a state of one of the hardware elements which is an object of control of the resource control program means 2-2. The "resource" object, however, is linked to a lower stage of the "home" object of the resource control program means 2-2 without fail.

In this manner, position information of the other objects and address information for transferring a control signal are provided in the objects of the directories 2-311 to 2-314 and retrieval of the distributed directory 2-31 and routing for a control message are performed simultaneously so that a personal communication service of a combination of different networks can be performed at a high speed.

Accordingly, such wasteful processing that, when a desired hardware resource cannot be found out by a retrieving operation performed for all stages of the tree structure of the distributed directory 2-31, another distributed directory 2-31 is retrieved need not be performed. Consequently, high speed communications between programs can be performed, and a personal communication service described above can be performed without a delay.

Figure 4:
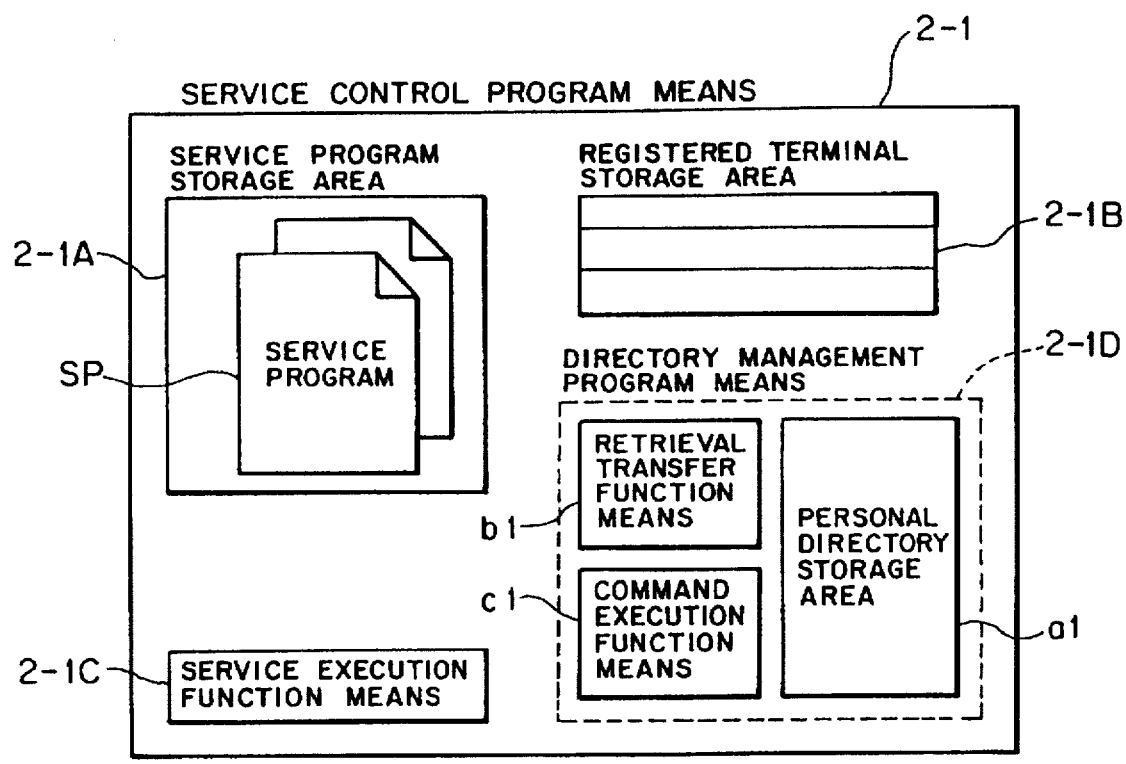
FIG. 4 is a diagrammatic view showing an example of the internal construction of service control program means of the personal communication service distributed control system of FIG. 3.

Referring now to FIG. 4, an example of the internal construction of the service control program means 2-1 is shown. The service control program means 2-1 shown has a service program storage area 2-1A for storing service programs SP, a registered terminal storage area (storage area for an identification name list peculiar to terminals used by a user) 2-1B, service execution function means 2-1C for executing a service program, and directory control program means 2-1D having a similar construction to that of the directory control program means 2-3 described hereinabove with reference to FIG. 3.

The registered terminal storage area 2-1B stores a directory name of the object (refer to FIG. 16) of the alias directory 2-312 for identification of a terminal object registered by a user. Here, the registered terminal storage area 2-1B allows simultaneous registration of a plurality of terminals.

The directory control program means 2-1D includes a personal directory storage area al, retrieval transfer function means b1 and command execution function means c1, and allows a user to get, by those means, information of a personal ID directory in the directory control program means 2-1D and re-define a personal ID of another user.

Upon transmission of information, when a user designates the directory name, the directory control program means 2-1D performs retrieval of the personal directory storage area al thereof by means of the retrieval transfer function means b1 thereof. Consequently, the distributed directory 2-31 described hereinabove with reference to FIG. 16 need not be retrieved, and accordingly, communication between different service control program means can be performed at a high speed.

Further, even where an originating person and a terminating person of information utilize terminals of different types, the originating person itself of the information can define a personal ID communication service for exclusive use for the individual user using the same personal ID which does not rely upon a terminal to be used.

Subsequently, an example of internal processing in control message transfer by the directory control program means 2-3 described above will be described with reference to FIG. 5. Also in this instance, a service control node whose Node ID is #01 (or Node ID: #02) (in the present example, such reference characters are used for convenience of identification of the nodes) as a service control apparatus includes a plurality of service control program means 2-1 (2'-1) and directory control program means 2-3 (2'-3). The directory control program means 2-3 (2'-3) includes retrieval transfer function means 2-32 (2'-32), an information table (correspondence table) 2-34 (2'-34) of home directories, and an area (hereinafter referred to as distributed directory) 2-31 (2'-31) for directories.

The distributed directory 2-31 includes an object of an alias directory 2-313 which has position information of an object of the other directory 2'-312 (memory address ptr:#441) and information of a transfer destination address as internal information 2-313A, and objects of home directories 2'-311 each of which has a transfer destination address and a list of control commands as internal information 2'-311A.

In order to transmit (transfer), for example, a control message whose command name is "operational" from the service control program means 2-1 (Node ID: #01, directory name: "1:1") to the other service control program means 2'-1 (Node ID: #02, directory name "n:k"), the service control program means 2-1 in the service control node (apparatus) (Node ID: #01) which receives the control message from a user who utilizes a communication service first transmits a control message necessary for execution of the service to an access point (ap:#1001, message queue of communication between processes) of the directory control program means 2-3.

The directory control program means 2-3 which receives the control message checks whether the transmission destination address of the control message is a directory name, a node ID, a process ID or a physical address indicated by a memory address.

Here, since the destination address of the control message received is a directory name ("n:k"), the control message is delivered to the retrieval transfer function means 2-32. The retrieval transfer function means 2-32 thus retrieves entries of the information table (correspondence table) 2-34 for home directories for an entry whose address coincides with the address "n:k" of the transmission destination directory.

As a result, as can be seen also from FIG. 5, since the information table 2-34 does not include the address "n:k" of the transmission destination address, the retrieval transfer function means 2-32 retrieves the route of the distributed directory 2-31 in the directory control program means 2-3, to which the retrieval transfer function means 2-32 belongs, stage by stage in order to find out the address "n:k" of the transmission destination address.

In this instance, the retrieval transfer function means 2-32 first retrieves objects which have the address "n" and then continues retrieval if the type of an object being retrieved is "directory" or "home".

In this instance, however, it is detected that the type of the object thus found out is "alias" and it is determined from internal information 2-313A of the object of the alias directory 2-313 that the object of the transfer destination is included in the directory control program means 2'-3 (ap:#0551) of the other service control node (apparatus) (Node ID: #02). Consequently, the control message is transferred to the directory control program means 2'-3 (ap:#0551).

Then, the retrieval transfer function means 2'-32 of the directory control program means 2'-3 which receives the thus transferred control message first retrieves the distributed directory 2'-31 in the downward direction beginning with the object "n" for the object ":k).

Then, when the retrieval transfer function means 2'-32 finds out the address "n:k" of the transfer destination directory, since the type of the object of the directory 2'-311 whose address is "n:k" is "home", the retrieval transfer function means 2'-32 gets the transfer destination address (Node ID: #02, AP: #1001) from internal information 2'-311A thereof and delivers a control message whose command name is "operation1" to the command execution function means 2'-33.

Further, the command execution function means 2'-33 which receives the control message whose command name is "operation1" checks whether the type of the command is a data (internal information) operation command of the object "n:k" or coincides with the command list in the inside of the object "n:k".

Then, if the command type is a data operation command, then the command execution function means 2'-33 performs operation of data of the object "n:k". In this instance, however, since "operation1" coincides with the command list of the internal information 2'-311A of the object, the command execution function means 2'-33 sets the transfer destination address to "Node ID: #02, AP: #1001) and transfers a control message to the object service control program means Since the object of the alias directory 2-313 has position information of an object of the other directory 2'-312. (memory address ptr:#441) or a transfer destination address for a control message in this manner, unnecessary retrieval of the object of the alias directory 2-313 and other objects need not be performed.

Further, since retrieval of the distributed directory 2-31 and routing for a control message can be performed simultaneously, the time required for retrieval for a desired hardware resource can be reduced remarkably to achieve high speed communication between programs and a personal ID communication service of a combination of different networks can be performed without a delay.

Subsequently, an example of processing when the directory control program means 2-3 transfers, where the service control program means 2-1 described above includes a personal directory storage area a1 for an individual user and retrieval transfer function means b1, a control message whose command name is "operation1" from the service control program means 2-1 (directory name: "1:1") to another service control program means (directory name: "Satoh") using the directory for exclusive use for the individual user will be described in detail with reference to FIG. 6. It is to be noted that, in FIG. 6, like reference characters denote like elements to those of FIG. 5 described hereinabove.

When it becomes necessary for the service control program means 2-1 to transmit a control message to the other service control program means 2'-1 while the service control program means 2-1 is executing different processing (for example, execution of a service program), the service control program means 2-1 produces a control message (control command) of the control command "operation1" and delivers the control message to the retrieval transfer function means b1 in the inside thereof.

The retrieval transfer function means b1 which receives the control message retrieves the personal directory storage area a1 for the coincident directory name "Satoh" similarly to that of the directory control program means 2-3.

When the object directory name "Satoh" is found out in the personal directory storage area a1, the retrieval transfer function means b1 detects from internal information 313a thereof that the object of the alias directory 2-313a is an alias of the home directory 2'-311 of the service control program means 2'-1, and gets a transfer destination physical address (02.0551.111) from the alias information.

The retrieval transfer function means b1 thus sets the transmission destination address of the control message to the physical address and transmits the control message to the directory control program means The directory control program means 2-3 which receives the control message checks whether the transmission destination address of the control message is a directory name, a node ID, a process ID or a physical address represented by a memory address.

Then, the directory control program means 2-3 detects that the transmission destination address of the control message is a physical address (02.0551.111) and immediately transfers a message to the other directory control program means 2'-3 (Node ID: #02, AP: #0551) without retrieving the distributed directory 2-31.

The retrieval transfer function means 2'-32 in the directory control program means 2'-3 which receives the thus transferred message determines that the type of the object (ptr:#111) of the object directory is "home", and gets a transfer destination address (Node ID: #02, AP: 1001) from the internal information 2'-311A of the home directory "n:k".

Thereafter, the control message is transferred to the object service control program means 2'-1 by way of the command execution function means 2'-33 in a similar manner as described hereinabove with reference to FIG. 5.

In this manner, when retrieval for a position of a desired hardware resource is performed, since the personal directory storage area a1 for the individual user is provided in the service control program means 2'-1, the user can define the directory name of the other party for communication to a simple name, that is, the name (Satoh) of the other party for communication. Consequently, a personal ID communication service for an individual user can be defined.

Further, when such directory name defined by the individual user is designated as an address of a transmission destination (the other party for communication), since the directory control program means 2-3 transfers a control message without retrieving the distributed directory 2-31 as described above, a personal ID communication service for exclusive use for the individual user free from a delay can be realized.

Figure 7:
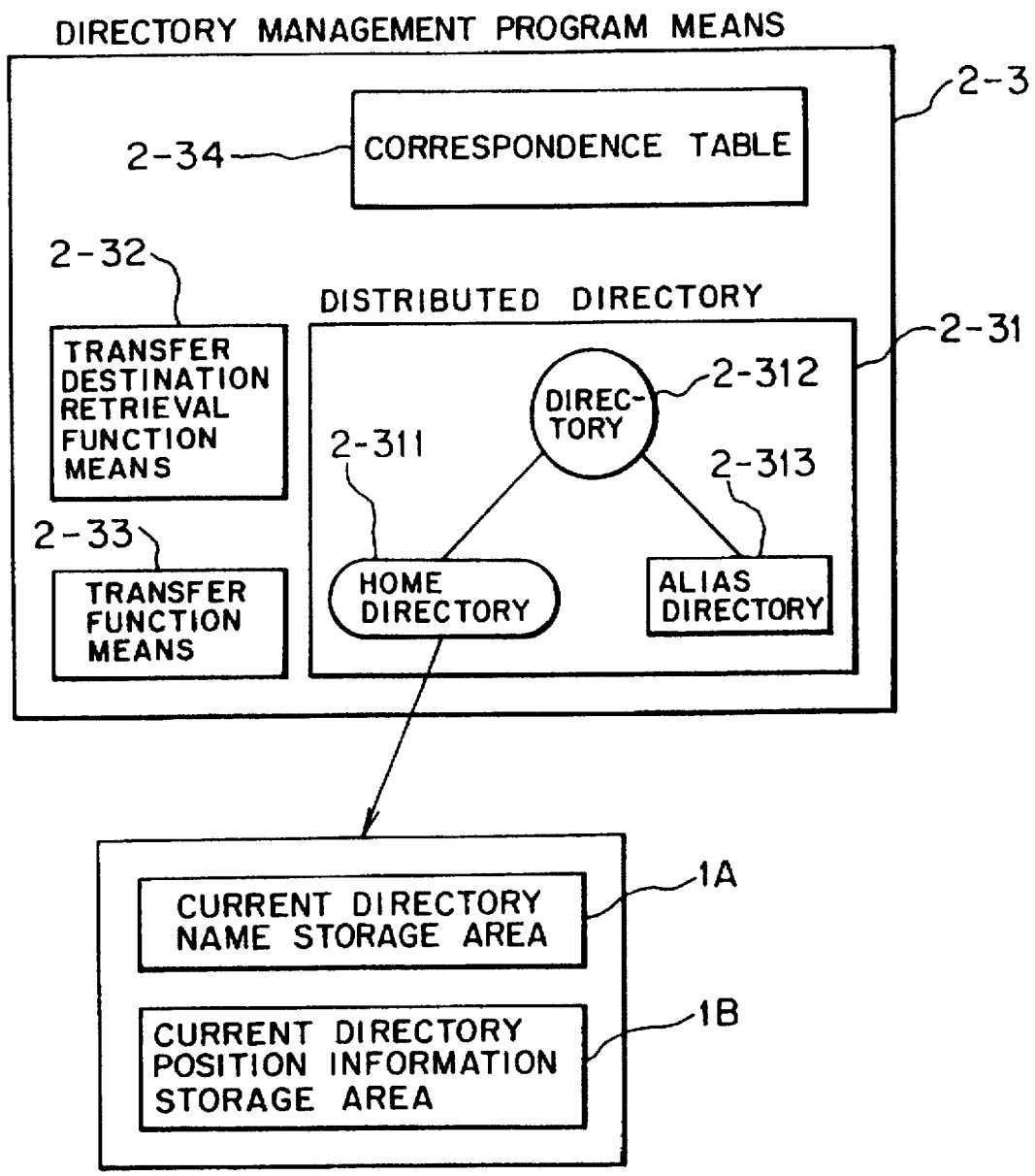
FIG. 7 is a block diagram showing an alternative example of the internal construction of the directory control program means of the personal communication service distributed control system of FIG. 3.

FIG. 7 shows another example of the directory control program means 2-3. Referring to FIG. 7, the directory control program means 2-3 shown includes, in addition to a distributed directory 2-31, retrieval transfer function means 2-32 and command execution function means 2-33 similar to those described hereinabove with reference to FIG. 16, a correspondence table 2-34.

In the directory control program means 2-3 shown in FIG. 7, the distributed directory 2-31 includes a home directory 2-311 and an alias directory 2-313. Further, the home directory 2-311 has a current directory name storage area 1A and a current directory position information storage area 1B.

The correspondence table 2-34 stores correspondence between home directory names of the service control program means 2-1 and the resource control program means 2-2 present in the same service control apparatus 2 and position information of the directories. The home directory 2-311 stores position information of the service control program means 2-1 or the resource control program means 2-2. The alias directory 2-313 stores connection information of a divided directory 2-312.

The current directory name storage area 1A stores a current directory name which indicates a start point of retrieval of the distributed directory 2-31. The current directory position information storage area 1B stores position information of the current directory.

In the directory control program means 2-3 of the construction described above, high speed communication between programs can be performed by referring to the correspondence table 2-34 for home directories and the current directory position information storage area 1B for a current directory without performing retrieval of any directory from the root of the directory to the current directory.

In the following, the operation described above will be described in detail with reference to FIG. 8 by way of an example wherein a control message whose command name is "operation1" is transmitted from the service control program means 2-1 (directory name: "1:1") to the other service control program means 2'-1 (current directory name: "n:k") without using such a directory name ("n:k" or "Satoh") as described hereinabove with reference to FIG. 5 or 6 but using an abbreviation mark "." representing a current directory.

It is to be noted that, also in this instance, the directory control program means 2-3 (2'-3) of the service control node of Node ID: #01 (Node ID: #02) as a service control apparatus includes a distributed directory 2-31 (2'-31), retrieval transfer function means 2-32 (2'-32), command execution function means 2-33 (2'-33), and an information table 2-34 (2'-34) for home directories as a correspondence table.

The distributed directory 2-31 (2'-31) includes a plurality of home directories 2-311 (2'-311) and an alias directory 2-313 (2'-313).

The alias directory 2-313 of the distributed directory 2-31 has, as internal information, a connection relationship to the directory 2'-312 (memory number ptr:#441) in the distributed directory 2'-31 of the other directory control program means 2'-3.

Further, each of the home directories 2-311 has a transfer destination address A-1 for a control signal, a current directory A-2 serving as the current directory name storage area 1A, and a position information table A-3 serving as the current directory position information storage area 1B.

When one of the service control program means 2-1 sends to the directory control program means 2-3 a control message whose control command name is "operation1" and which designates "." representing a current directory as a transmission destination address, the retrieval transfer function means 2-32 in the directory control program means 2-3 which receives the control message detects that the current directory "." is included in the transmission destination address, and detects, in order to detect a current directory, a memory address of the home directory "1:1" of the service control program means 2-1 of the transmission source from the information table 2-34.

Consequently, the retrieval transfer function means 2-32 detects that the memory address of the home directory "1:1" is "ptr:#005", and thus detects from the current directory storage area A-2 of the internal information 2-311A of the object of the home directory 2-311 and gets a physical address (02.0551.111) of the directory "n:k" from the position information table A-3.

Thereafter, similarly as in the example described hereinabove with reference to FIG. 5 or FIG. 6, the control message is transferred to the directory control program means 2'-3 (Node ID: #02, AP: #0551) and then transferred to the object service control program means 2'-1 (Node ID: #02, AP: #1001) by way of the command execution function means-2'-33.

In this manner, if the abbreviation mark "." representing a current directory "n:k" which makes a start point of retrieval can be included in the designation of a reception side address of the other party for communication in communication between programs, then since a control message can be transferred to the other directory control program means 2'-3 without performing retrieval from the root of the distributed directory 2-31 to the current directory "n:k", high speed program communication can be performed. Further, since the abbreviation mark can be included in the receive side address, header information of a control message and the controlling traffic can be reduced.

Figure 9:
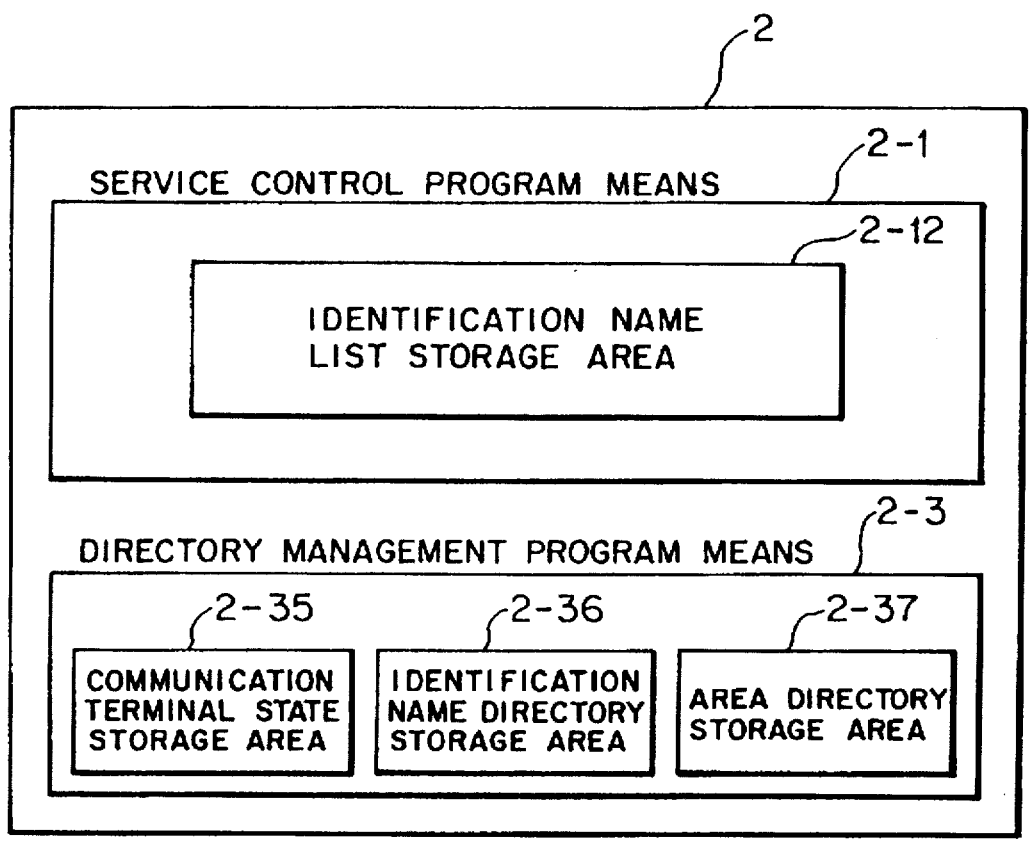
FIG. 9 is a block diagram showing another example of the internal construction of the service control apparatus of the personal communication service distributed control system of FIG. 3.

FIG. 9 shows another example of the internal construction of the service control apparatus 2. Also the service control apparatus 2 shown in FIG. 9 includes service control program means 2-1 and directory control program means 2-3. The service control program means 2-1 has an identification name list storage area 2-12 while the directory control program means 2-3 has a communication terminal state storage area 2-35, an identification name directory storage area 2-36 and an area directory storage area 2-37.

The identification name list storage area 2-12 stores identification names peculiar to terminals utilized by a user. The communication terminal state storage area 2-35 stores states of the communication terminals. The identification name directory storage area 2-36 stores a directory for the identification names peculiar to the communication terminals. The area directory storage area 2-37 stores physical positions of areas in which the communication terminals are present.

In the service control apparatus 2 of the construction described above shown in FIG. 9, since position control of a communication terminal can be performed by variation of the area directory storage area 2-37 in the directory control program means 2-3 and terminal registration management of the user can be performed by the identification name list storage area 2-12 of the service control program means 2-1, position control of the communication terminals of different networks and user registration control can be performed.

Figure 10:
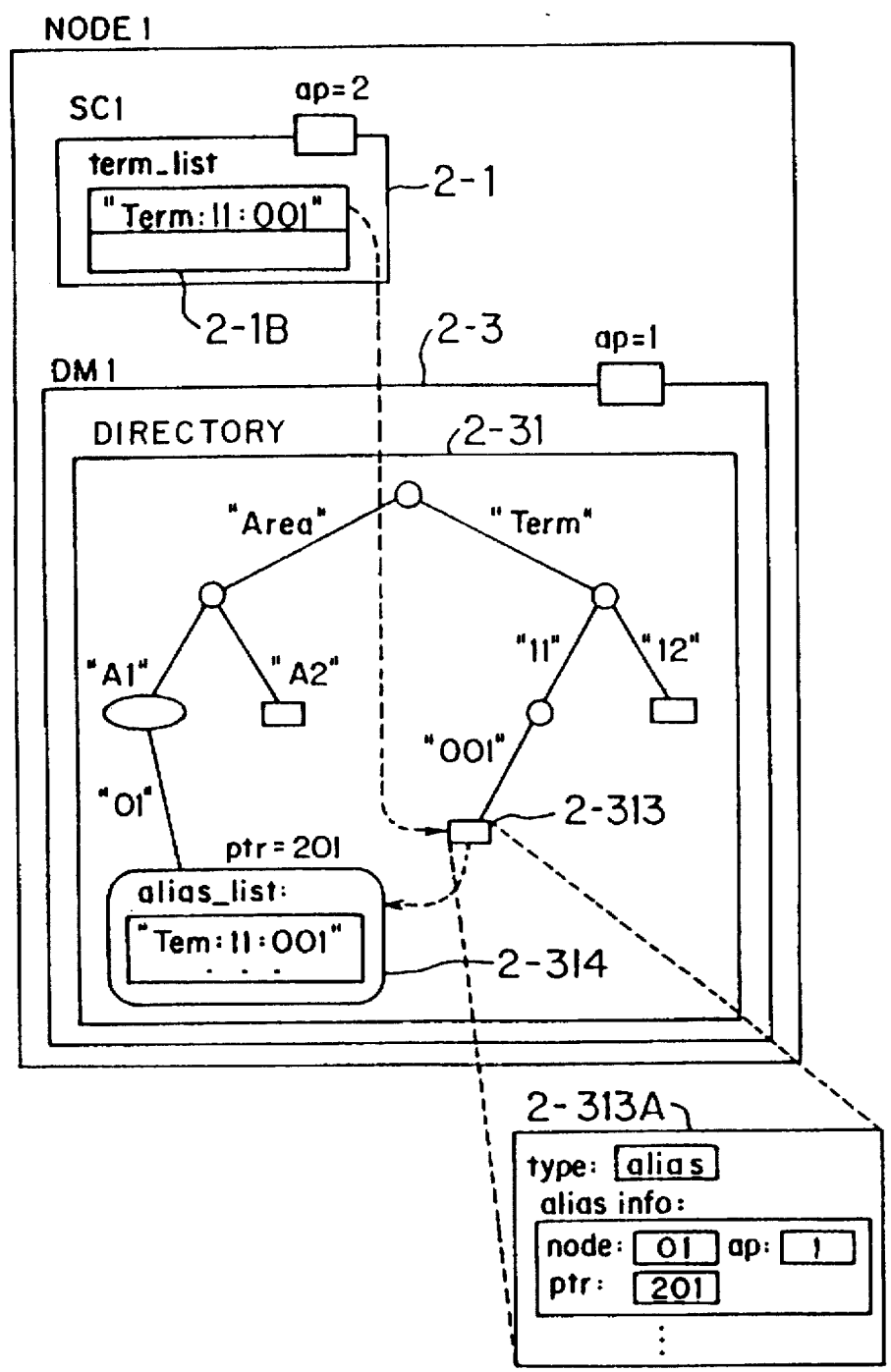
FIG. 10 is a diagrammatic view illustrating terminal registration control of a user in the personal communication service distributed control system of FIG. 3.

In the following, operation of the service control apparatus 2 constructed in such a manner as described above will be described in detail with reference to FIG. 10. Particularly, description will be given of an example wherein a terminal is registered into the service control program means 2-1 and the directory control program means 2-3 in response to a control message which requests registration of a terminal "Term:11:001" whose control area belongs to "Area:A1"

It is to be noted that, also in this instance, the node NODE1 formed as the service control apparatus 2 includes, in the inside thereof, service control program means 2-1 and directory control program means 2-3. The service control program means 2-1 has, in the inside thereof, a registered terminal storage area 2-1B for terminals utilized by a user. Further, the directory control program means 2-3 has, in the inside thereof, a distributed directory 2-31.

Further, the directory constituting the inside of the distributed directory 2-31 is constituted from objects of directories which hold position information of terminals of "Area", "A1" and "A2" and objects of directories which hold terminal names of "Term", "11" and "12" and states of the terminals.

When a control message requesting registration of a terminal is received by the service control program means 2-1, the service control program means 2-1 transfers the control message to the directory control program means 2-3. The directory control program means 2-3 which receives the control message retrieves distributed directory 2-31 in the inside thereof for an object "Term:11", and when the object "Term:11" is found out, the directory control program means 2-3 newly produces another object "001" of an alias directory 2-313 at the lower stage to the object "Term:11"

Further, the directory control program means 2-3 retrieves for the object "Area:A1" and, if the object "A1" is found out, then the directory control program means 2-3 produces a new object of a resource directory 2-314 at the lower stage to the object "A1" and copies the address information "Term:11:001" of the terminal mentioned above as internal information.

Upon completion of the copying, the directory control program means 2-3 copies connection information between the object "A1" and the object "001" of the alias directory 2-313 as internal information of the alias directory 2-313, thereby completing registration of the portable terminal "Term:11:001".

On the other hand, cancellation of registration of a terminal can be performed only by deleting the object produced in the registration processing described above.

Figure 11:
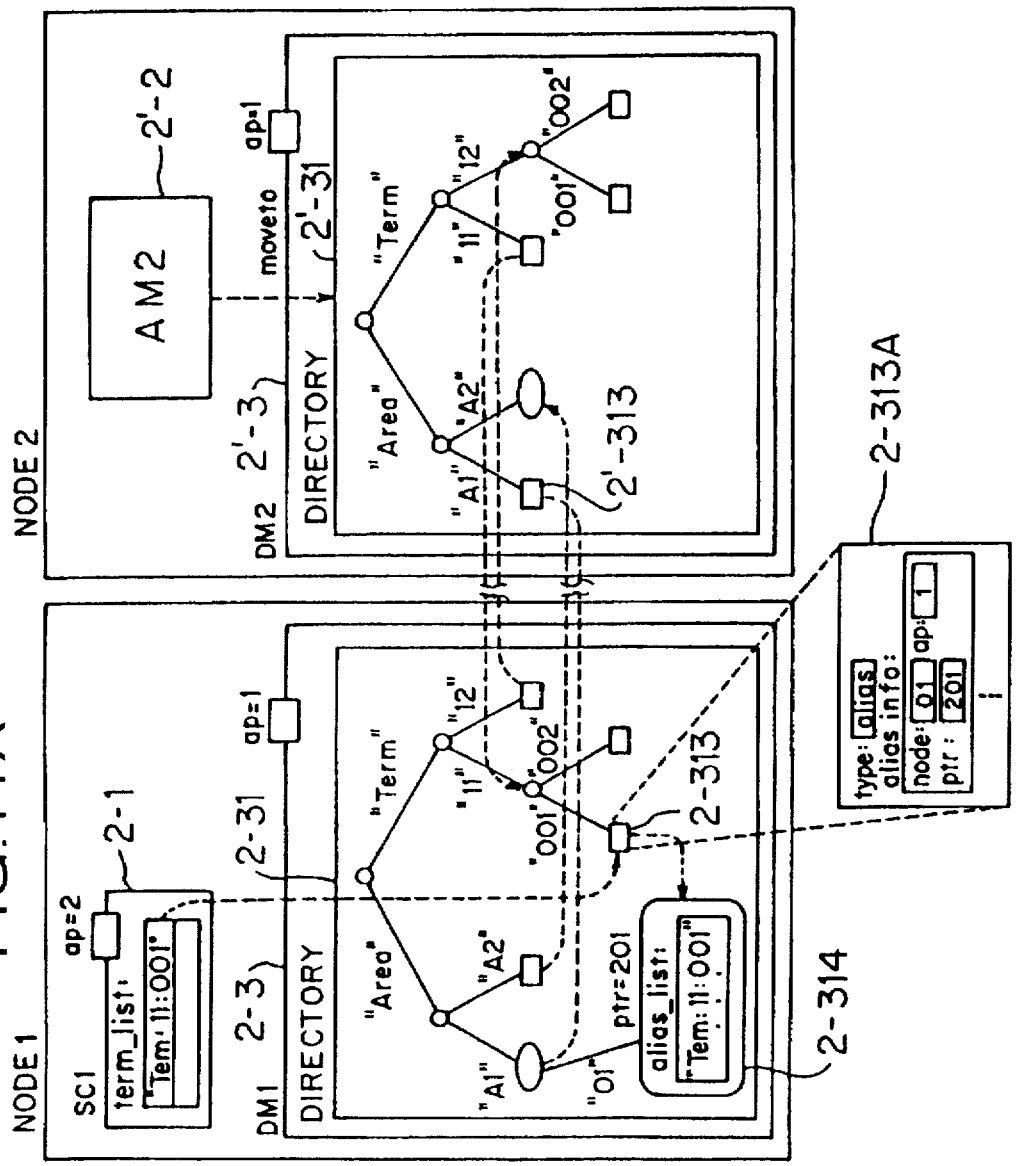
FIGS. 11 and 12 are diagrammatic views illustrating an example of position information control of a terminal and terminal registration control of a user in the personal communication service distributed control system of FIG. 3 before and after movement of a terminal, respectively.
Figure 12:
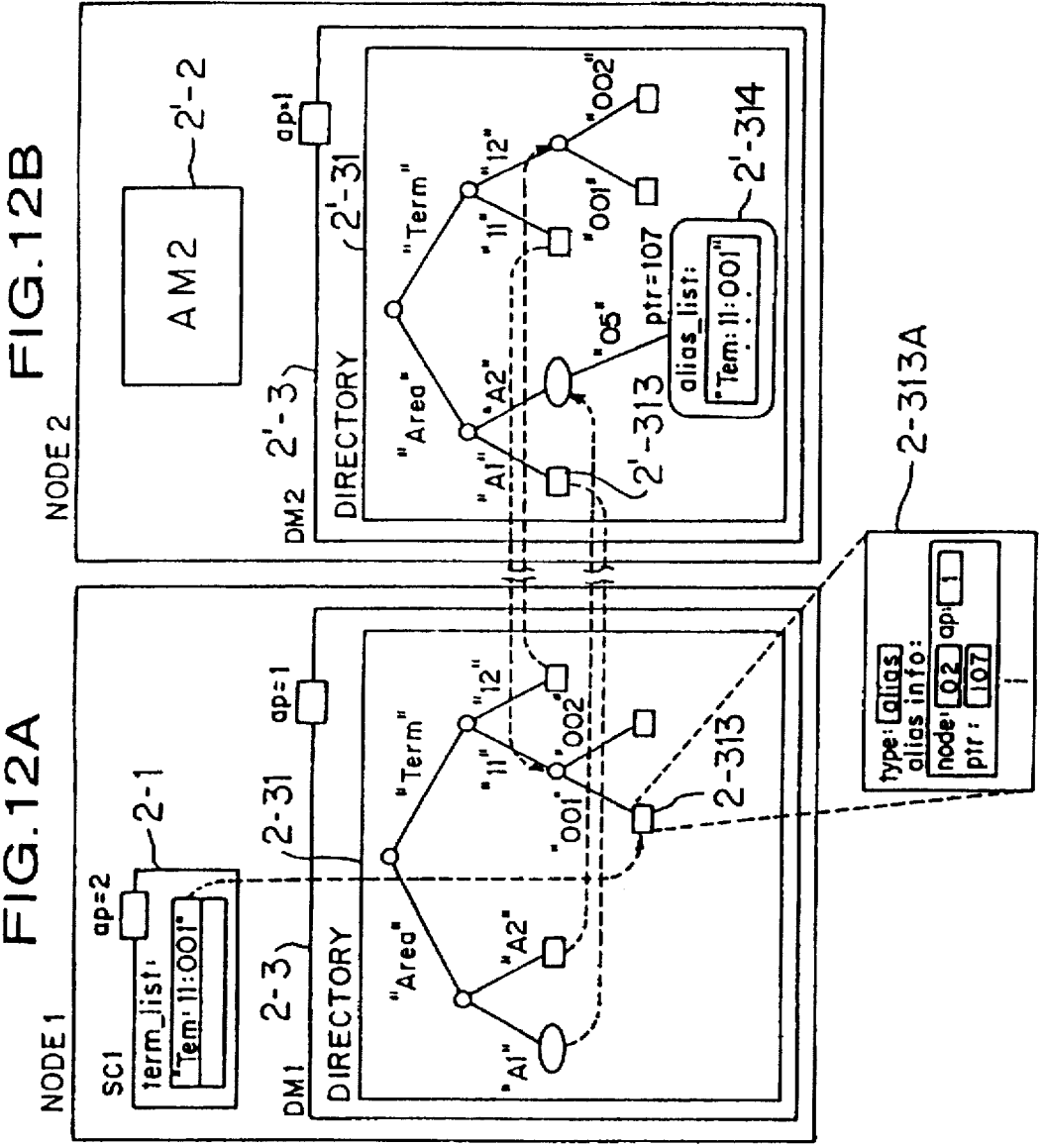

FIGS. 11 and 12 illustrate an example wherein the control area of the portable terminal "Term:11:001" registered in such a manner as described above is varied from "Area:A1" to "Area:A2", and particularly, FIG. 11 illustrates a condition before the variation whereas FIG. 12 illustrates another condition after the variation.

Figure 13:
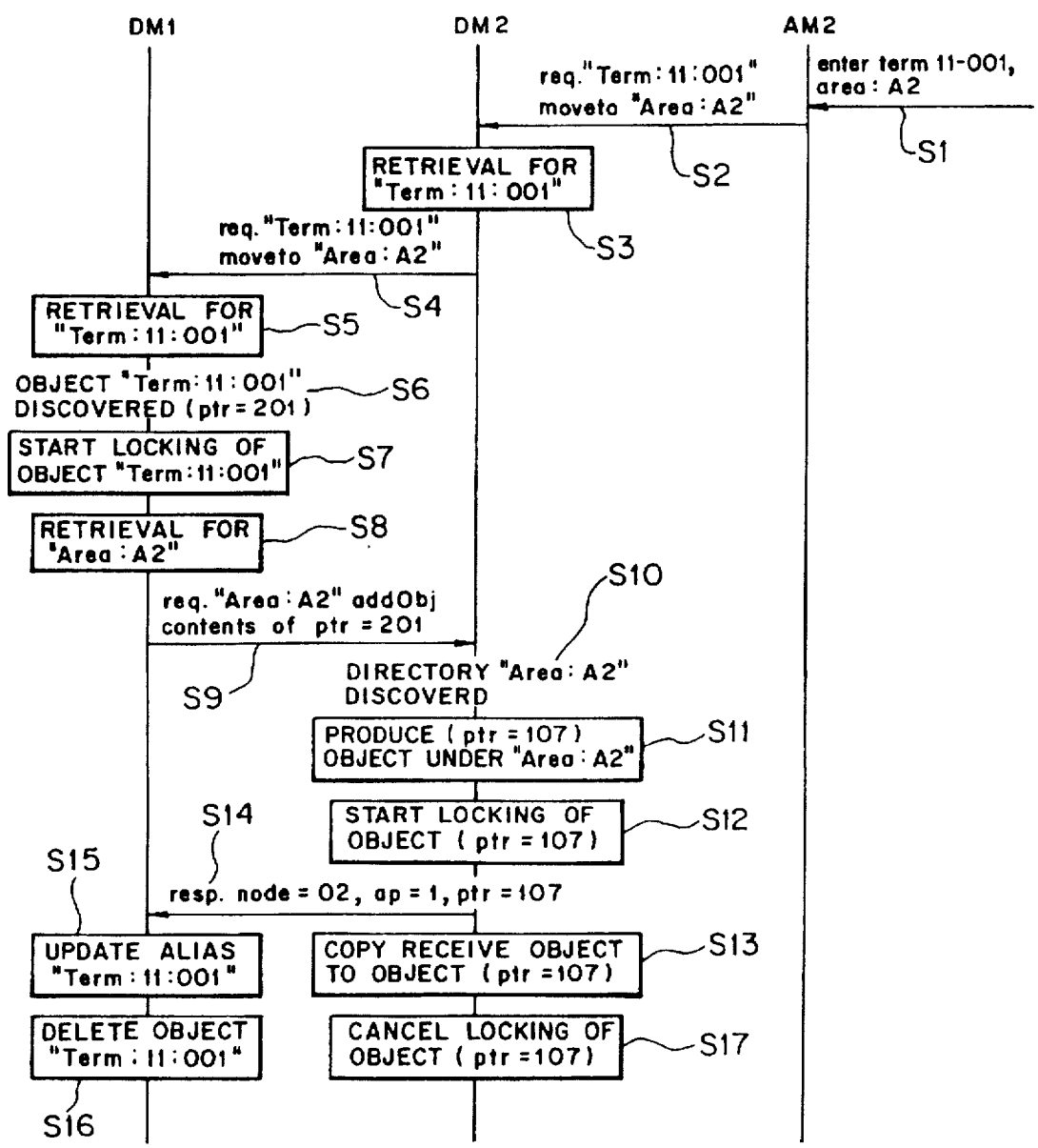
FIG. 13 is a flow diagram illustrating operation of the position information control of a terminal and the terminal registration control of a user illustrated in FIGS. 11 and 12.

Meanwhile, FIG. 13 illustrates interrelated operations (steps S1 to S16) of the directory control program means 2-3 and 2'-3 (DM1 and DM2) and the resource control program means 2-2 (AM2) in such variation of the control area.

Referring first to FIGS. 11 and 13, when the resource control program means 2'-2 (AM2) detects that the portable terminal "Term:11:001" has entered the area A2 ("Area:A2") (step S1), it transmits a directory variation command "moveto" to the directory control program means 2'-3 (step S2).

The directory control program means 2'-3 retrieves for the object "Term:11:001" of the moved terminal (step S3), and thus determines from the object of the alias directory 2'-313 that the object "Term:11:001" is present in the other directory control program means 2-3. Consequently, the directory control program means 2'-3 transfers the directory variation command "moveto" to the directory control program means 2-3 (step S4).

The directory control program means 2-3 (DM1) which receives the directory variation command "moveto" retrieves for "Term:11:001" (step S5).

Then, if the directory control program means 2-3 (DM1) discovers the object "Term:11:001" (step S6), it locks the object "Term:11:001" (step S7).

Thereafter, the directory control program means 2-3 (DM1) retrieves the directory "Area:A2" of the location after the movement (step S8), and produces a command "addObj" to copy the object to the directory "Area:A2" and transfers the command "addObj" to the directory control program means 2-3 (DM2) (step S9).

Referring now to FIGS. 12 and 13, when the directory control program means 2'-3 (DM2) discovers the directory "Area:A2" (step S10), it produces a new object of a resource directory 2'-314 at the lower stage to the directory "Area:A2" (step S11), locks the object (step S12) and copies the object "Term:11:001" into the new object of the resource directory 2'-314 (step S13).

Here, alias information of the new object of the resource directory 2'-314 is sent back as a response to the directory control program means 2-3 (DM1) which is the source of transmission of the command "addObj" (step S14).

Then, the directory control program means 2-3 (DM1) updates the alias of the "Term:11:001" in accordance with the received alias information (step S15) and deletes the object of the source of copying (step S16).

Further, after the directory control program means 2'-3 (DM2) completes the copying of the object "Term:11:001", it cancels the locking of the object (step S17).

Since processing for registration and cancellation of a terminal of a user and variation of position information of the terminal can be performed only by production, deletion and variation, respectively, of an object of the area directory "A1" in the directory control program means 2-3 (DM1), effective registration and position information management of a terminal can be performed.

Figure 14:
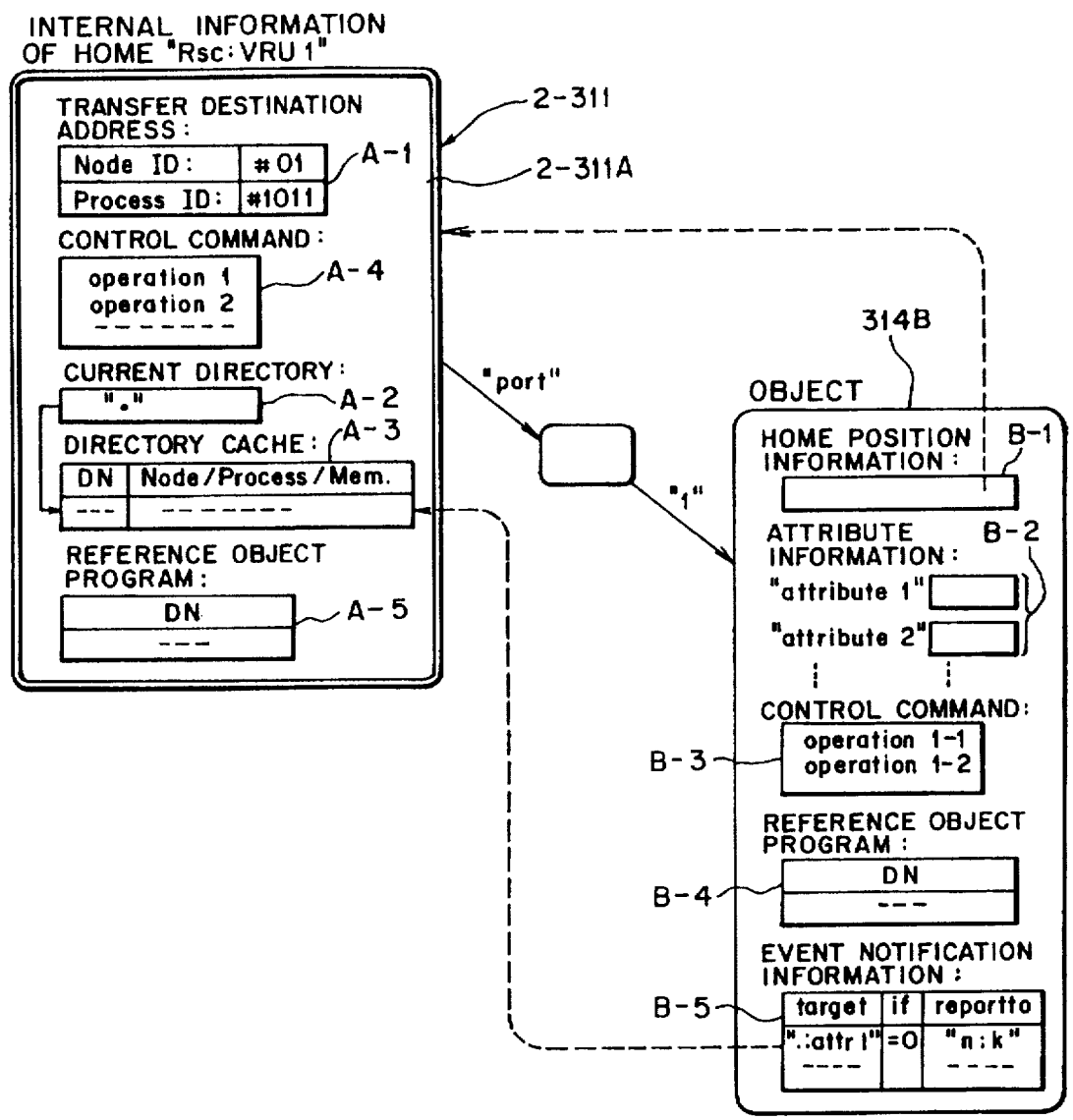
FIG. 14 is a diagrammatic view illustrating an example of event notification reservation setting to an object in the personal communication service distributed control system of FIG. 3.

An example of setting of event notification reservation for an object such as production, deletion or variation of an object described above will be described in detail below with reference to FIG. 14. In this instance, an object (internal information) 2-311A of the home directory 2-311 has a storage area A-1 for a transfer destination address for a control message, a storage area A-2 for a current directory name, a directory cache A-3 serving as a position information table (correspondence table) for current directories, a list storage area A-4 for control commands, and a storage area A-5 for a name of an object program to be referred to.

Further, an object 314B which belongs to the lower stage to the home directory 2-311 has a storage area B-1 for information of a home position for storing position information of the home directory 2-311, a storage area B-2 for attribute information, a storage area B-3 for a list of control commands, a storage area B-4 for an object program to be referred to, and a storage area B-5 for event notification requirements.

Where the setting is such that an event is notified to a service control program "n:k" when an attribute value "attribute1" of an object name "Rsc:VRU1:port:1" under a home directory name "Rsc:VRU1" of the resource control program means 2-2 becomes equal to "0", if the resource control program means 2-2 rewrites the attribute information "attribute1" of the storage area B-2 for attribute information of the object 314B ("Rsc:VRU1:port:1) to "0", then the directory control program means 2-3 extracts from the storage area B-5 for event notification requirements a notification destination address "n:k" to which an event is to be notified, extracts alias information of "n:k" from the storage area B-1 for home position information, and notifies the event by way of the home directory of the notification destination.

Further, an example wherein notification of an event is performed where a plurality of objects 314B are present in the example described hereinabove with reference to FIG. 14 will be described in detail with reference to FIG. 15. It is to be noted that, in FIG. 15, like reference characters denote like elements to those of FIG. 14 described hereinabove.

Figure 15:
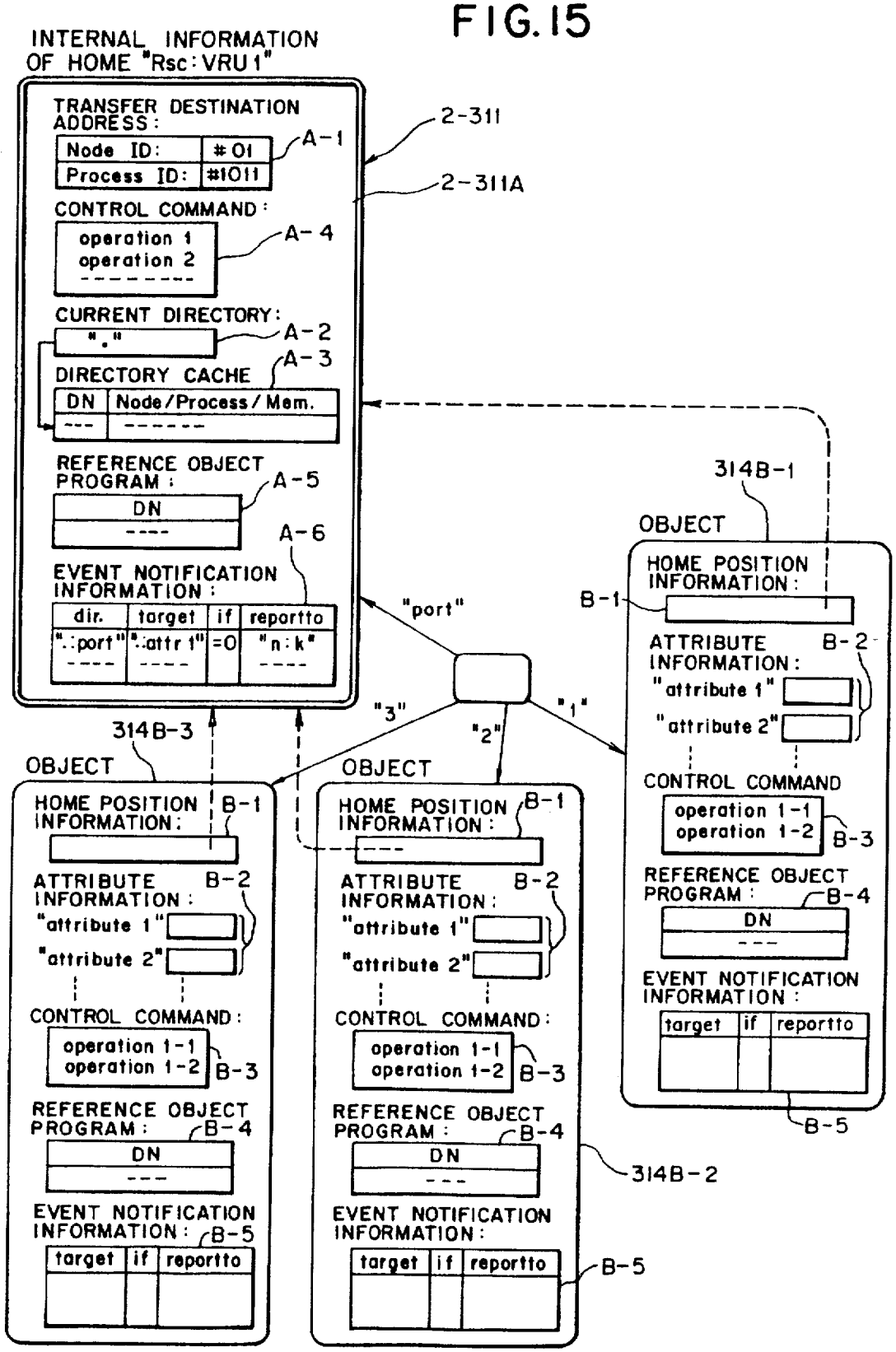
FIG. 15 is a diagrammatic view illustrating an example of event notification reservation setting for a plurality of objects in the personal communication service distributed control system of FIG. 3.

An object (internal information) 2-311A of the home directory 2-311 whose directory name is "Rsc:VRU1" has, in addition to the storage areas A-1 to A-5 shown in FIG. 15, a storage area A-6 for event notification requirements.

The storage area A-6 for event notification requires has set therein a requirement that "an event is notified to "n:k" when the value of the attribute information "attribute1" in the storage area B-2 of any of objects under the directory name "Rsc:VRU1:port" changes to "0". In this condition, if the resource control program means 2-2 rewrites the value of the attribute information "attribute1" of the storage area B-2 of any one of objects 314B-1, 314B-2 and 314B-3 to "0", then the thus rewritten object performs transmission of an event by way of a same route as that of the example described hereinabove with reference to FIG. 14. However, also the other objects perform transmission of an event similarly based on the event notification requirement in the storage area A-6.

In particular, even if no event notification requirement is set, for example, in the storage area B-5 of the object 314B-2, if the attribute information "attribute1" changes to "0", then a notification of an event is transmitted referring to the event notification requirement in the storage area A-6 provided in the object (internal information) 2-311A of the home directory 2-311.

Since a notification requirement for a condition variation event of an object is set in the inside of the object 314B present at the lower stage to the object (internal information) 2-311A of the home directory 2-311 ("Rsc:VRU1") or a notification requirement for a condition variation event is set in the inside of the object 2-311A of the home directory 2-311 ("Rsc:VRU1") and all of the objects 314B-1 to 314B-3 present at the lower stage to the object 2-311A of the home directory 2-311 ("Rsc:VRU1") in this manner, the resource control program means 2-2 need not perform processing taking an event notification into consideration, and flexibility can be provided to a communication service for exclusive use for an individual user handled by the service control program means 2-1.

c. Second Embodiment of the Invention

A second embodiment of the present invention will be described subsequently with reference to the drawings.

Figure 17:
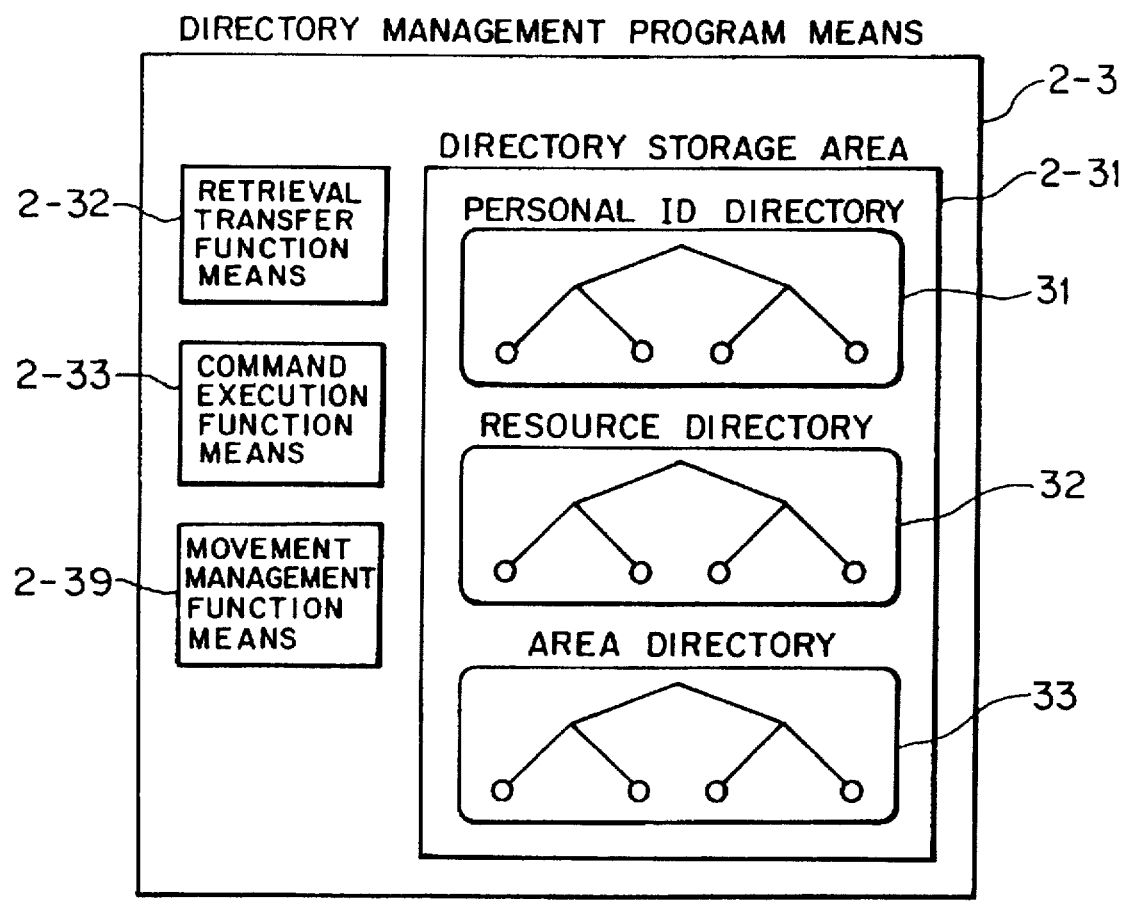
FIG. 17 is a block diagram showing the construction of directory control program means of a personal communication service distributed control system according to a second preferred embodiment of the present invention.

FIG. 17 shows a construction of directory control program means 2-3 of a personal communication service distributed control system according to the second embodiment of the present invention. Referring to FIG. 17, the directory control program means 2-3 shown includes, in addition to a directory storage area (distributed directory) 2-31, retrieval transfer function means 2-32 and command execution function means 2-33 which are similar to those described hereinabove in connection with the personal communication service distributed control system of the first embodiment of the present invention, movement management function means 2-39. Further, the directory storage area 2-31 in the present embodiment includes a personal ID (personal identification information) directory 31, a resource directory 32 and an area directory 33. It is to be noted that the construction of the entire personal communication service distributed control system is similar to that in the first embodiment shown in FIG. 3.

The personal ID directory 31 stores information for identification of service control program means 2-1 for individual users. The resource directory 32 stores information for identification of terminals (hardware resources) such as a telephone set 7 and a personal computer 8 (referred to FIG. 3). The area directory 33 is provided for identification of geographical positions of users and terminals and stores locations of users and terminals in the representation of a hierarchic relationship of geographical areas (physical positions).

The movement management function means 2-39 moves, for example, when a user who utilizes a portable information terminal 9 has geographically moved to a different area, the service control program means 2-1 in a service control apparatus 2, which has provided a service to the portable information terminal 9 utilized by the user, to another service control apparatus which provides a service to the area into which the user has moved. In particular, the movement management function means 2-39 performs variation of the area directory 33 of the distributed directory 2-31 and movement of the service control program means 2-1 (refer to FIG. 3).

Figure 18:
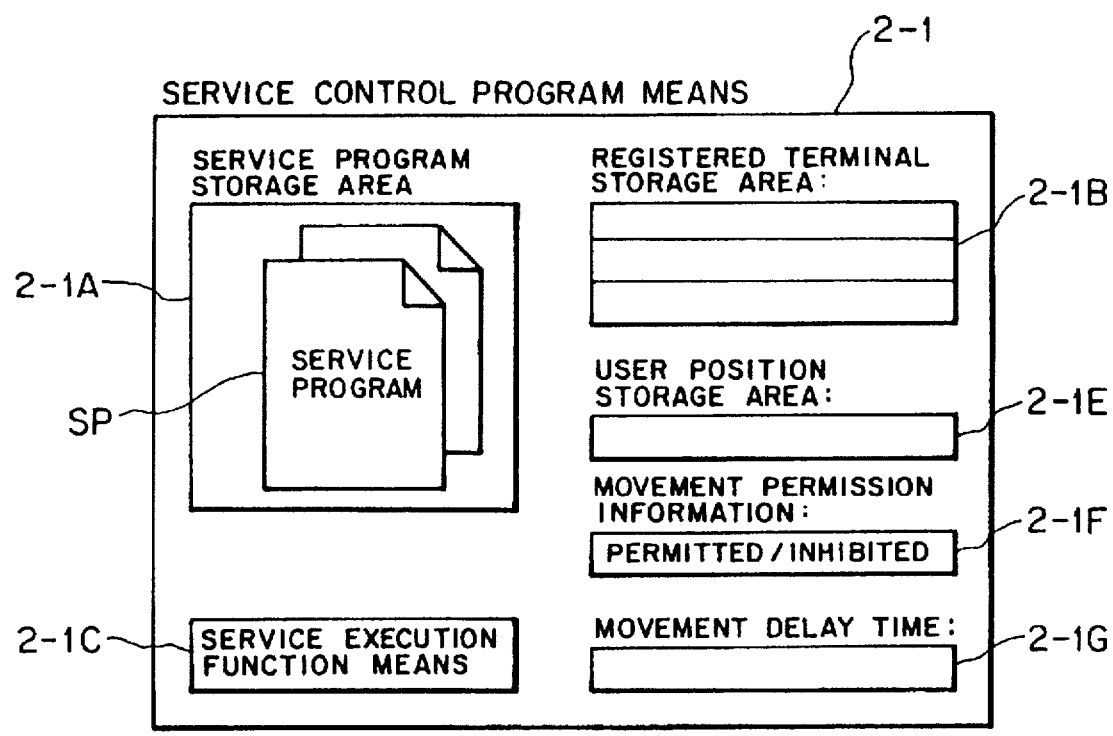
FIG. 18 is a block diagram showing the construction of service control program means of the personal communication service distributed control system of the second embodiment.

The service control program means 2-1 in the present embodiment is constructed in such a manner as shown in FIG. 18. In particular, referring to FIG. 18, the service control program means 2-1 shown includes, in addition to a service program storage area 2-1A for storing service programs SP similar to that described hereinabove with reference to FIG. 4, a registered terminal storage area 2-1B and a service execution function means 2-1C, a user position storage area 2-1E, a movement permission information storage area 2-1F and a movement delay time setting section 2-1G.

The user position storage area 2-1E is a memory for storing an area directory name representative of a destination of movement of the service control program means 2-1 and is updated at a suitable time by the service control program means 2-1. A relative address of the area directory name in the user position storage area 2-1E is used when it is required to get information of the area directory 33 (refer to FIG. 17) in the directory control program means 2-3 or when it is required to transmit a control signal to an object in the area directory 33 in which states of communication terminals including the portable information terminal 9 are stored.

The movement permission information storage area 2-1F stores information set in advance regarding whether or not movement of the service control program means 2-1 is permitted. The service control program means 2-1 refers to the set information of the movement permission information storage area 2-1F to determine whether or not movement of the service control program means 2-1 should be permitted.

The movement delay time setting section 2-1G sets a time by which movement of the service control program means 2-1 should be delayed. Thus, movement of the service control program means 2-1 is delayed in accordance with the set information of the movement delay time setting section 2-1G. It is to be noted that, since description of the service program storage area 2-1A, the registered terminal storage area 2-1B and the service execution function means 2-1C has been given in the foregoing description of the first embodiment, overlapping description of them is omitted here.

In the following, various processes by the service control program means 2-1 and the directory control program means which are essential elements of the personal communication service distributed control system having such construction as described above will be described.

First, when a user wants to register a terminal or cancel such registration, the user will operate for registration of the terminal (or cancellation of such registration) similarly as in the first embodiment. Consequently, that service control program means 2-1 of the service control apparatus 2 which controls the terminal requests the directory control program means 2-3 in the service control apparatus 2 to transmit a terminal registration (or cancellation) command to corresponding service control program means 2-1 of the user.

Then, the directory control program means 2-3 which receives the request transfers the command to the corresponding service control program means 2-1 of the user using the personal ID directory 31 thereof. The service control program means 2-1 which receives the terminal registration (or cancellation) command adds (or deletes) an identification name of the terminal into (or from) the registered terminal storage area 2-1B in the inside thereof.

Further, in this instance, the service control program means 2-1 discriminates whether or not the type of the terminal to be registered is a terminal (hereinafter referred to as user position detection terminal) which may possibly move geographically like a portable information terminal 9 such as a portable telephone set. If the terminal to be registered is a user position detection terminal, then the service control program means 2-1 reads out an area directory name representative of the user position from the received command and updates the information of the service control program means 2-1 based on the area directory name.

Thereafter, the service control program means 2-1 produces an event notification setting command for the terminal to be registered (or canceled) and sets variation of the area directory name of the terminal as a notification requirement. Then, the service control program means 2-1 transmits the event notification setting command to the directory control program means 2-3. Then, in the directory control program which receives the event notification setting command, retrieval for a corresponding terminal object 331 is performed, and setting (or deletion in the case of cancellation) of the event notification condition of the command is performed for the terminal object 331.

In particular, when it is required to get information of the area directory 33 in the directory control program means 2-3 or transmit a command (control signal) to the terminal object 331, since an area directory name (relative address) of the area directory 33 stored in the service control program means 2-1 is used, the control command can be transferred at a high speed without by way of any other service control apparatus 2'.

Figure 19:
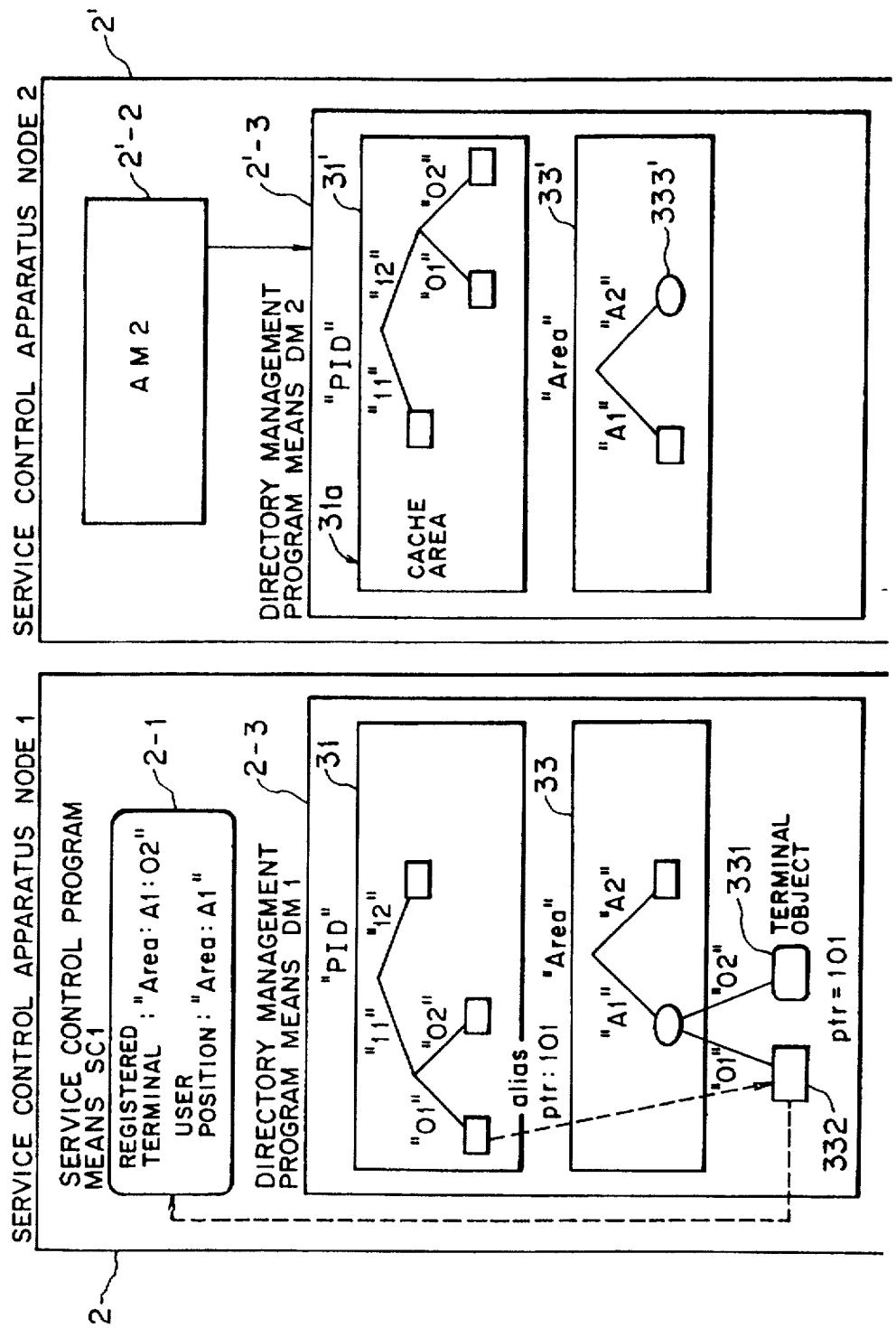
FIGS. 19 and 20 are diagrammatic views illustrating processing of moving the service control program means of FIG. 17 between different service control apparatus.
Figure 20:
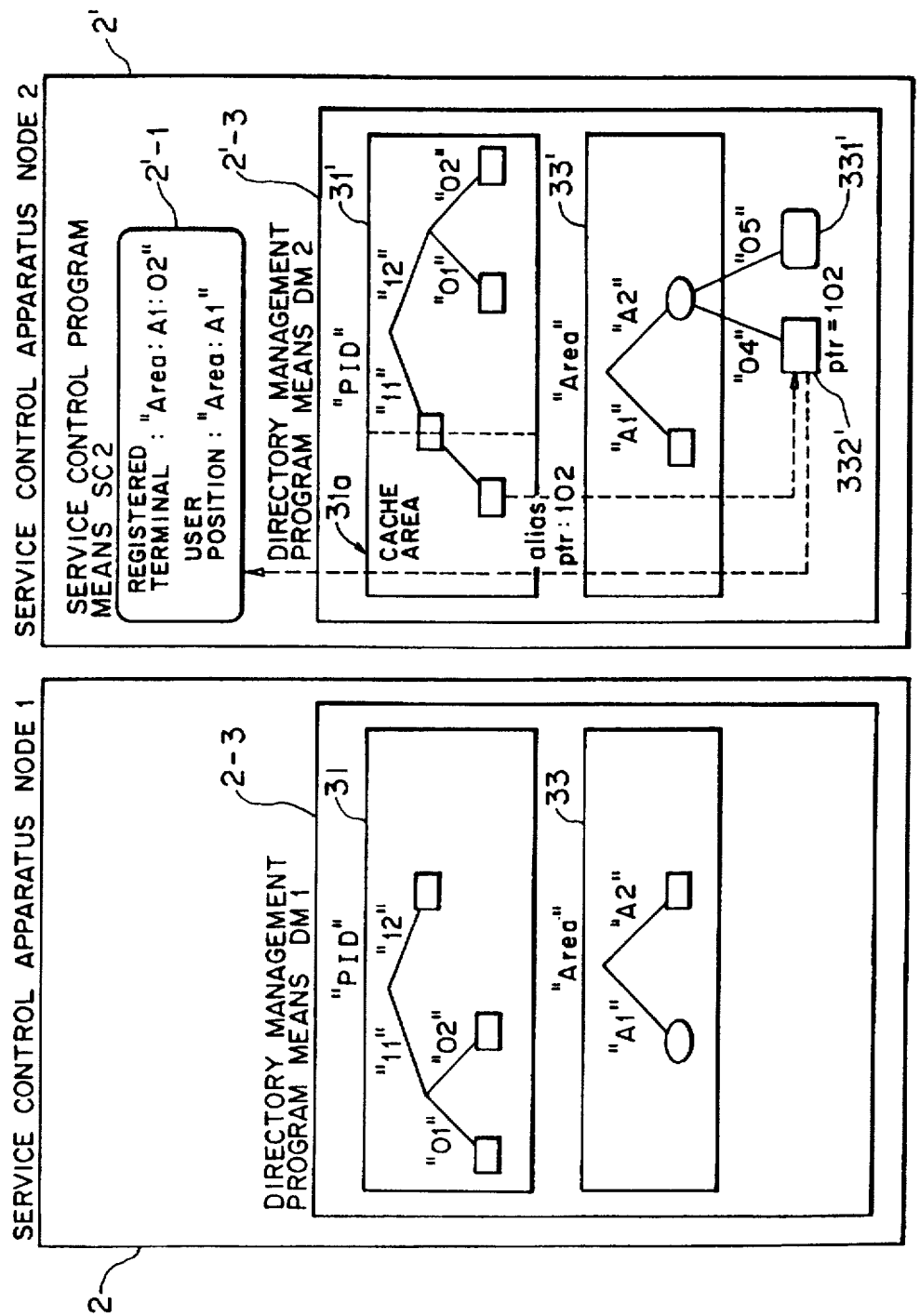

Subsequently, processing when the terminal (for example, the portable information terminal 9) registered in such a manner as described above moves geographically will be described in detail with reference to FIGS. 19 and 20 and FIG. 21 which shows a-sequence diagram (steps E1 to E29). It is to be noted that FIG. 19 illustrates a condition of the service control apparatus before the registered terminal moves while FIG. 20 illustrates another condition of the service control apparatus after the registered terminal has moved. Further, in FIGS. 19 to 21, the service control apparatus 2 from between the two service control apparatus 2 and 2' which operate in an interlocking relationship with each other is represented as "NODE1" while the other service control apparatus 2' is represented as "NODE2"; the service control program means 2-1 and the directory control program means 2-3 in the service control apparatus 2 are represented as "SC1" and "DM1", respectively; and the service control program means 2'-1, the resource control program means 2'-2 and the directory control program means 2'-3 in the service control apparatus 2' are represented by "SC2", "AM2" and "DM2", respectively.

If a terminal "02" present in the area A1 ("Area:A1") which is a control area of the service control apparatus 2 is registered as shown in FIG. 19 by such processing as described above, then in the directory control program means 2-3, the information "Area:A1:02" of the registered terminal is stored into the terminal object 331 of the area directory 33 and "Area:A1:01" is set as an identification name of the registered terminal into a home object 332 of the area directory 33. Further, the alias object 311 of the personal ID directory 31 is set so that it indicates the address of the area directory 33 as a relative address.

In this instance, in the service control program means 2-1, "Area:A1:02" is stored as information of the registered terminal into the registered terminal storage area 2-1B (refer to FIG. 18), and "Area:A2" is stored as geographical position information of the user into the user position storage area 2-1E (refer to FIG. 18).

In this instance, if the registered terminal thereafter moves into another area A2 ("Area:A2") which is the control area of the service control apparatus 2', then the movement of the terminal is detected by the resource control program means (AM) 2'-2 from a position detection event transmitted thereto from the terminal (step E1), and a requesting message (req."Area:A1:02"moveto "Area:A2") to vary the area directory "Area:A1" of the object "Area:A1:02" of the terminal to "Area:A2" is transmitted to the directory control program means 2'-3 in the service control apparatus 2' (step E2).

Then, in the directory control program means 2'-3, retrieval for the object "Area:A1:02" of the moved terminal is performed by the internal personal ID directory (PID) 31' (step E3), and the requesting message is transferred to the directory control program means 2-3 in the other service control apparatus 2 (step E4).

The directory control program means retrieves for the object "Area:A1:02" of the moved terminal based on information of the home object 332 in the area directory 33 in which the physical position of the moved terminal is stored (step E5). In other words, the object "Area:A1:02" of the moved terminal is retrieved using the relative address in the area directory 33. Thereafter, when the terminal object "Area:A1:02" (object 331: refer to FIG. 19) is found out (step E6), locking of "Area:A1:02" is started (step E7) so that the object "Area:A1:02" may not be rewritten inadvertently, and then retrieval for the area directory "Area:A2" of the destination of the movement is started by the area directory 33 (step E8).

Further, the directory control program means 2-3 produces a requesting message (req."Area:A2" addObj") to produce a new terminal object in the directory "Area:A2" being retrieved, and transmits the requesting message to the directory control program means 2'-3 (step E9).

The directory control program means 2'-3 which receives the requesting message produces, after the directory "Area:A2" (directory 333') is found out (step E10), a new terminal object "Area:A2:05" (terminal object 331') at the lower stage to the directory "Area:A2" as shown in FIG. 20 (step E11) and locks the object "Area:A2:05" so that the contents of it may not be rewritten inadvertently (step E12). Further, the directory control program means 2'-3 sends back a response message (resp) as a response to the directory control program means 2-3 (step E13).

Then, in the directory control program means 2'-3, the object "Area:A1:02" of the terminal received from the directory control program means 2'-3 is copied into the terminal object "Area:A2:05" produced as described above (step E14), and the locking of the terminal object "Area:A2:05" is canceled (step E15).

Meanwhile, in the directory control program means 2-3, after a notification of completion of copying of the terminal object is received, the terminal object "Area:A1:02" in the locked condition is deleted (step E16). The movement of the terminal object is completed with the processing till now.

Then, in the directory control program means 2'-3, an event message (event "Area:A1:02", "Area:A2") of the variation of the area is transmitted from the event variation notification (variation of the area directory) set in the object "Area:A2:05" of the moved terminal to the service control program means 2-1 (step E17). The service control program means 2-1 which receives the event message thus updates the internal information of the registered terminal storage area 2-1B and the user position storage area 2-1E to "Area:A1:02" and "Area:A2", respectively, thereby to store the user position (step E18).

Thereafter, a movement request (req."Area:A1:02" moveto "Area:A2") for a home object is transmitted from the service control program means 2-1 to the directory control program means 2-3 (step E19). The directory control program means 2-3 which receives the request detects that the movement of the home object from the service control program means 2-1 spans between the service control apparatus 2 and the service control apparatus 2', and starts locking of the home object "Area:A1:01" (step E20). Then, the directory control program means 2-3 transmits a processing ending request to the service control program means 2-1 (step E21).

Then, the service control program means 2-1 transmits user information such as the registered terminal information ("Area:A1:02") or the user position information ("Area:A1") to the directory control program means 2-3 (step E22), thereby ending the processing.

Further, in the directory control program means 2-3, retrieval for the directory "Area:A2" is started (step E23), and the user information transferred thereto from the service control program means 2-1 is transmitted to the directory control program means 2'-3 (step E24).

Then, in the directory control program means 2'-3, for a service control program means 2'-1 to be produced newly, the user information transferred thereto from the directory control program means 2-3 is transmitted (steps E25 and E26), and a new service control program means 2'-1 is produced on the service control apparatus 2'0 by the movement management function means 2'-39 in the directory control program means 2'-3 Further, a home object 332' is produced at the lower stage to the directory "Area:A2" (directory 333') in the area directory 33', and the user information transferred thereto is copied there and an identification name of it is set to "Area:A2:04" (step E27).

Further, in the personal ID directory (PID) 31' in the directory control program means 2'-3, an alias object "PID:11:01" (alias object 311') which indicates the home object "Area:A2:04" (home object 332') of the service control program means 2'-1 in the form of a relative address is produced in a cache area 31a as a memory area for storing information (cache data) of a personal ID thereby to set a link between the home object "Area:A2:04" and the alias object "PID:11:01".

As a result, since the memory area into which the home object "Area:A2:04" has been copied serves as a common memory area which is referred to by the area directory 33' and the cache area 31a, the memory area necessary to copy the home object "Area:A2:04" can be reduced, and besides, when the copy of the personal ID and the home object "Area:A1:01" (home object 332: refer to FIG. 19) of the service control program means 2-1 is to be moved between the service control apparatus 2 and 2' and a control command (control signal) is to be transmitted between the service control program means 2-1 and 2-1', if the cache area 31a is retrieved preferentially, then transfer of the control command can be performed at a high speed.

Thereafter, if a movement completion notification is transmitted from the directory control program means 2'-3 to the directory control program means 2-3 (step E28), then the directory control program means 2-3 deletes the home object "Area:A1:01" (home object 332: refer to FIG. 19) in the locked condition (step E29), thereby completing the processing of moving the service control program means 2-1 in the service control apparatus 2 to the service control apparatus 2'.

In short, the processing described above makes it possible to move, in the processing for movement of a terminal in the first embodiment described hereinabove with reference to FIGS. 11 to 13, the service control program means 2-1 to the other service control apparatus 2' upon movement of the terminal.

As described above, with the personal communication service distributed control system in the present embodiment, since also service control program means 2-1 which controls a terminal which is being used by a user can be used, upon movement of the user, between the service control apparatus 2 and 2', to whichever position the user moves, a personal communication service with a reduced delay can be achieved.

By the way, when also service control program means 2-1 for controlling a terminal which is being used by a user is moved to another service control apparatus 2' upon movement of the user, if such movement of the user occurs frequently, there is the possibility that the processing for execution of a service may be delayed.

Thus, if the personal communication service distributed control system is modified such that whether or not movement of the service control program means 2-1 should be permitted is determined based on the setting in the movement permission information storage area 2-1F in regard to whether or not movement of the service control program means 2-1 should be permitted and that whether or not movement of the service control program means 2-1 should be permitted is determined based on the setting in the movement permission information storage area 2-1F in regard to whether or not movement of the service control program means 2-1 should be permitted and also on the setting in the movement delay time setting section 2-1G in regard to a predetermined time by which movement of the service control program means 2-1 should be delayed and then the movement of the service control program means 2-1 is delayed based on the setting in the movement delay time setting section 2-1G, then useless movement of the service control program means 2-1 by the terminal which moves frequently can be suppressed.

In this instance, referring to FIG. 22, after a geographical position of a user is stored into the user position storage area 2-1E (refer to FIG. 18) in the service control program means 2-1 in a similar manner as in the processing up to step E18 described hereinabove with reference to FIG. 21, the service control program means 2-1 first discriminates whether or not permission of movement of the service control program means 2-1 is set in the movement permission information storage area 2-1F (step F1). If such permission of movement is set, then a timer is set to "current time"+"time set by the movement delay time setting section 2-1G" (from the YES route of step F1 to step F2). On the contrary if such permission of movement is not set, then no processing is performed and no movement of the service control program means 2-1 is performed either (from the NO route of step F1 to step F3).

Thereafter, when the time set in the timer elapses, this is notified to the service control program means 2-1 (step F4). Thus, the service control program means 2-1 discriminates whether or not the user position stored in the user position storage area 2-1E and the position of the service control program means 2-1 are equal to each other (step F5).

Figure 21:
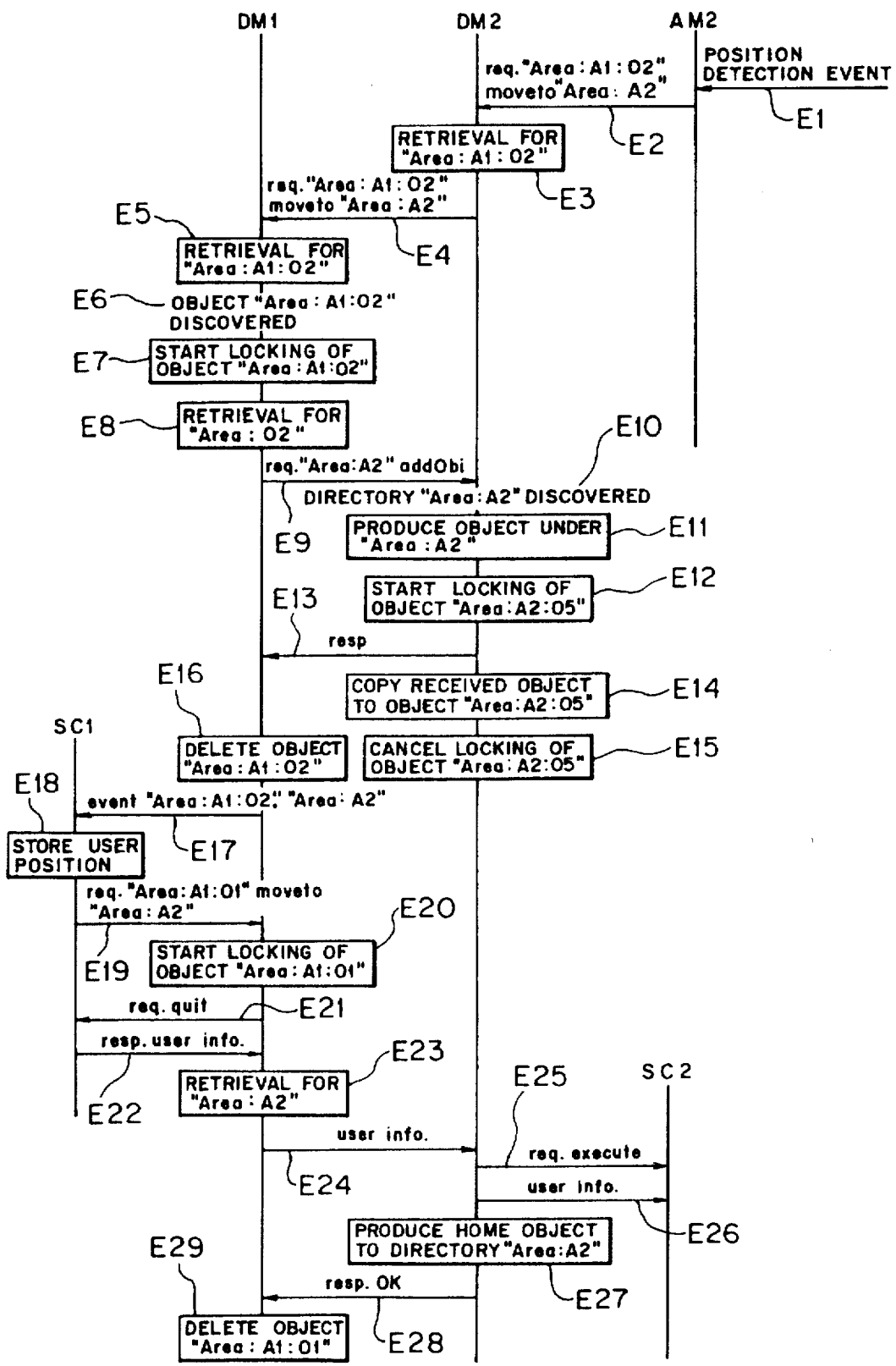
FIG. 21 is a sequence diagram illustrating the processing of moving the service control program means illustrated in FIGS. 19 and 20.
Figure 22:
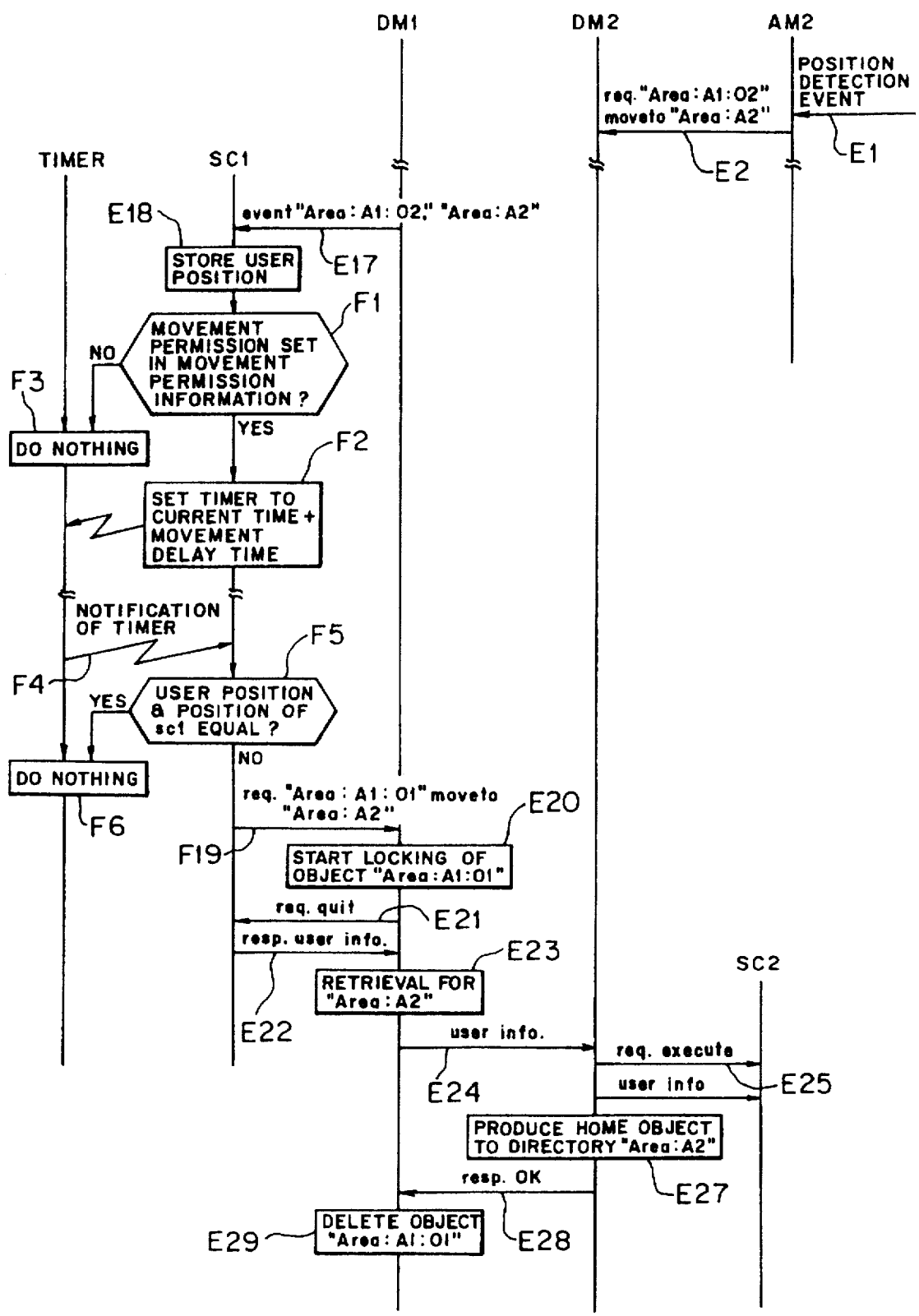
FIG. 22 is a similar view but illustrating different processing of moving the service control means of FIG. 17.

If it is discriminated that the user position and the position of the service control program means 2-1 are equal to each other, then no movement of the service control program means 2-1 is performed (from the YES route of step F5 to step F6), but if the positions are not equal to each other, then movement of the service control program means 2-1 to a service control apparatus (in the case of FIG. 22, the service control apparatus 2') of an area into which the terminal of the user has moved is performed similarly as at steps E19 to E29 described hereinabove with reference to FIG. 21.

Accordingly, if the terminal of the user returns to its original area before the time set in the timer elapses, since the position in the user position storage area 2-1E stored in the service control program means 2-1 and the position of the service control program means 2-1 coincide with each other, movement of the service control program means 2-1 is not performed.

Since whether or not movement of the service control program means 2-1 to the other service control apparatus 2' should be performed can be determined based on the setting in the movement permission information storage area 2-1F in the service control program means 2-1 and the movement of the service control program means 2-1 can be delayed in accordance with the setting of the delay time in the movement delay time setting section 2-1G, useless movement of the service control program means 2-1 is not performed for a user which, for example, repeats movement frequently, and consequently, a personal communication service can be performed at a high speed.

Figure 23:
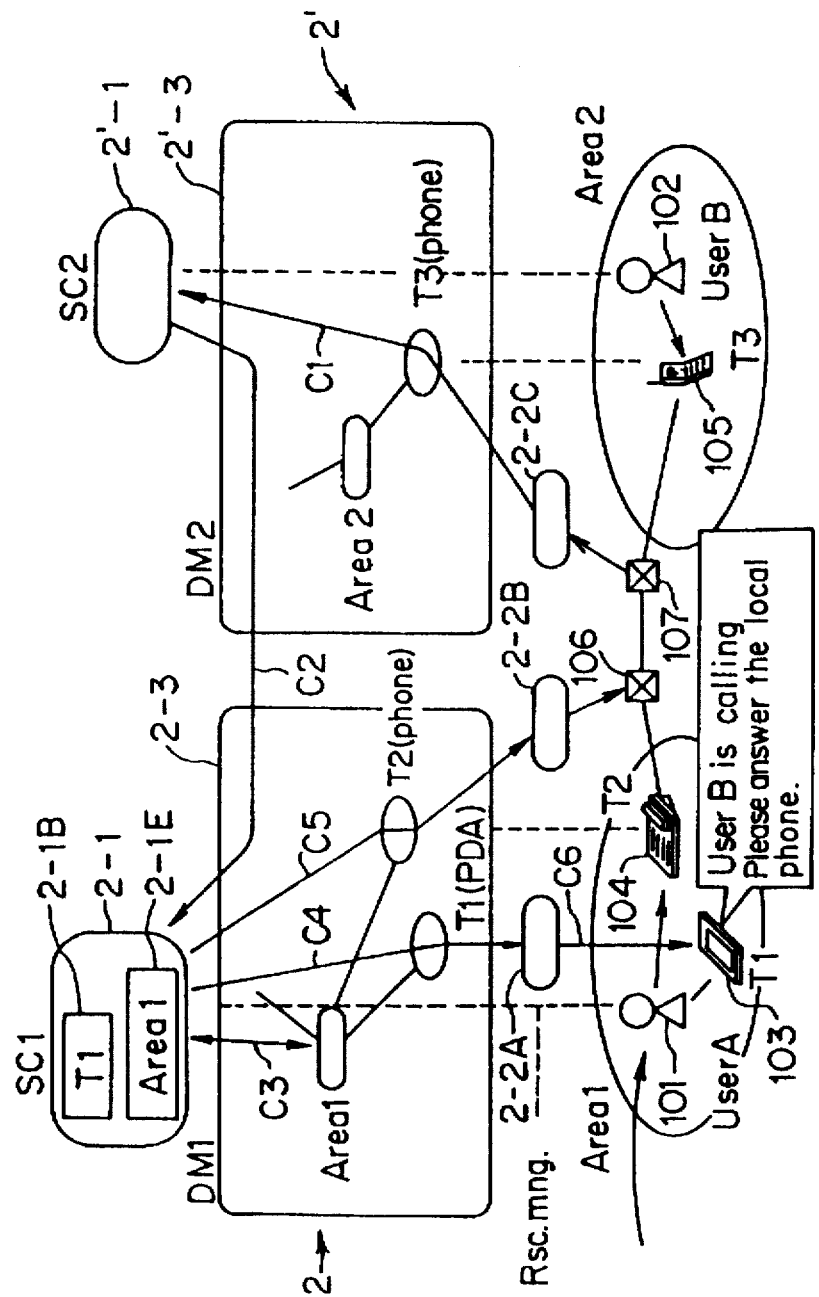
FIG. 23 is a diagrammatic view illustrating connection processing between terminals when the service control program means of FIG. 18 is moved between different service control apparatus.
Figure 24:
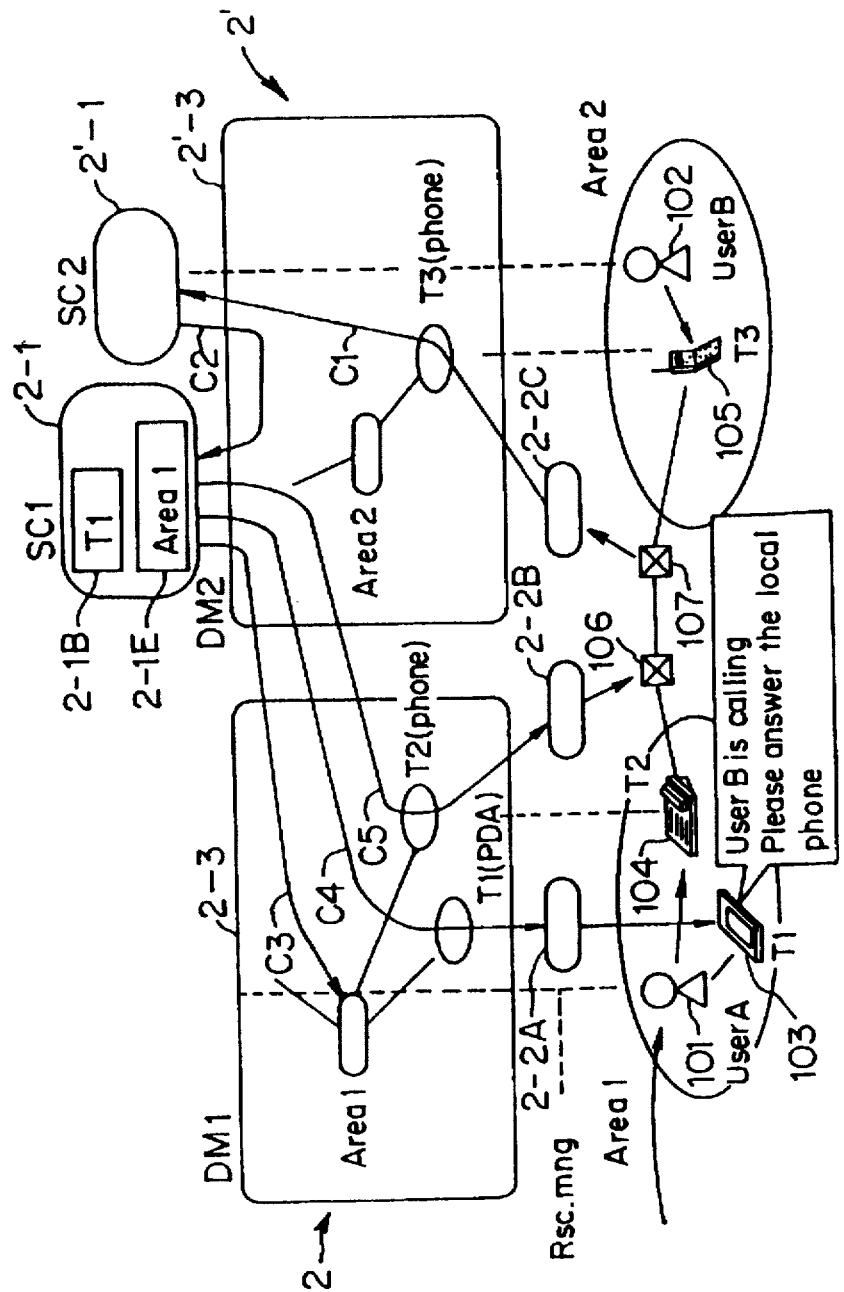
FIG. 24 is a similar view but illustrating connecting processing between the terminals when the service control program means is not moved between the service control apparatus.
Figure 26:
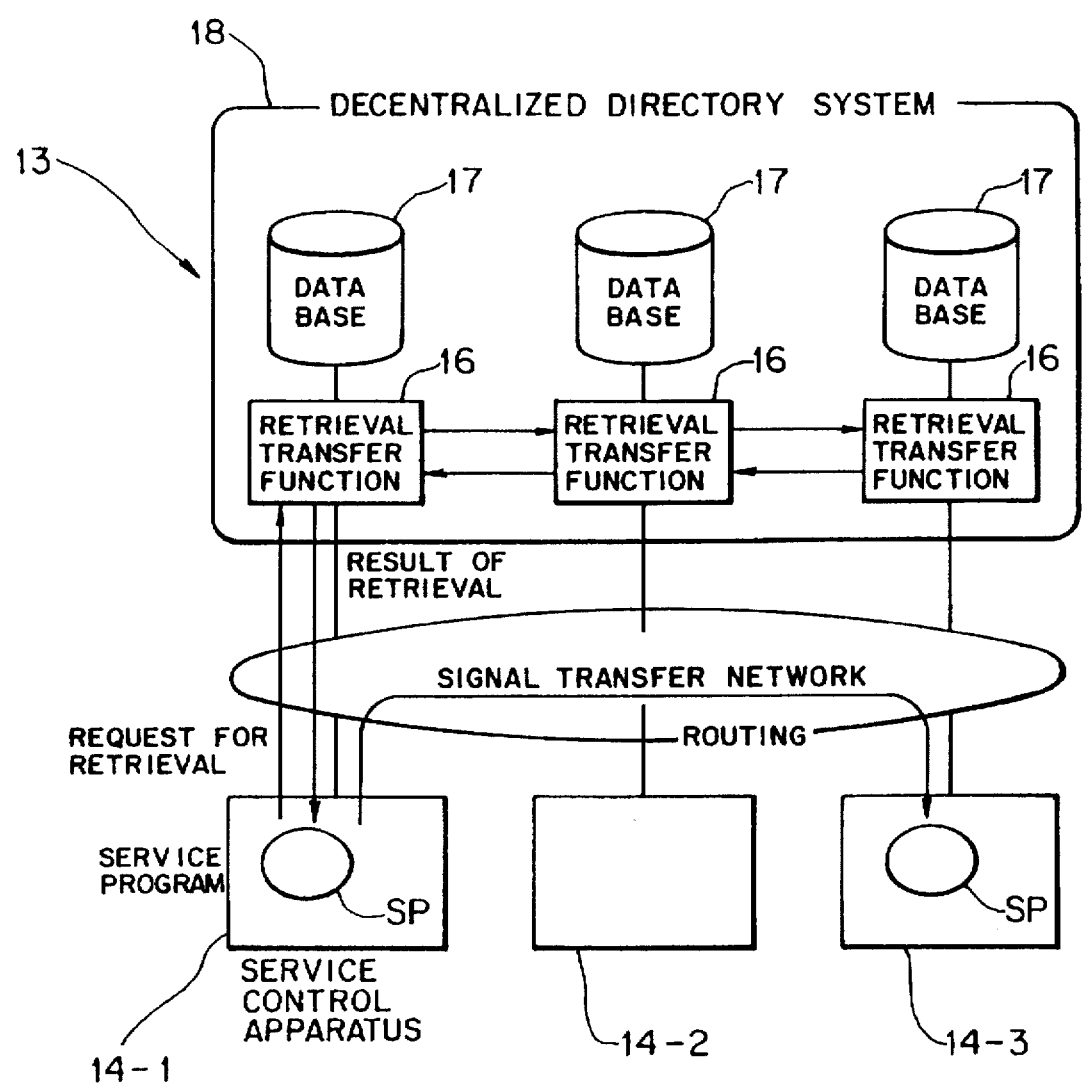
FIG. 26 is a block diagram showing an outline of a system architecture which makes use of distributed directory data bases.
Figure 27:
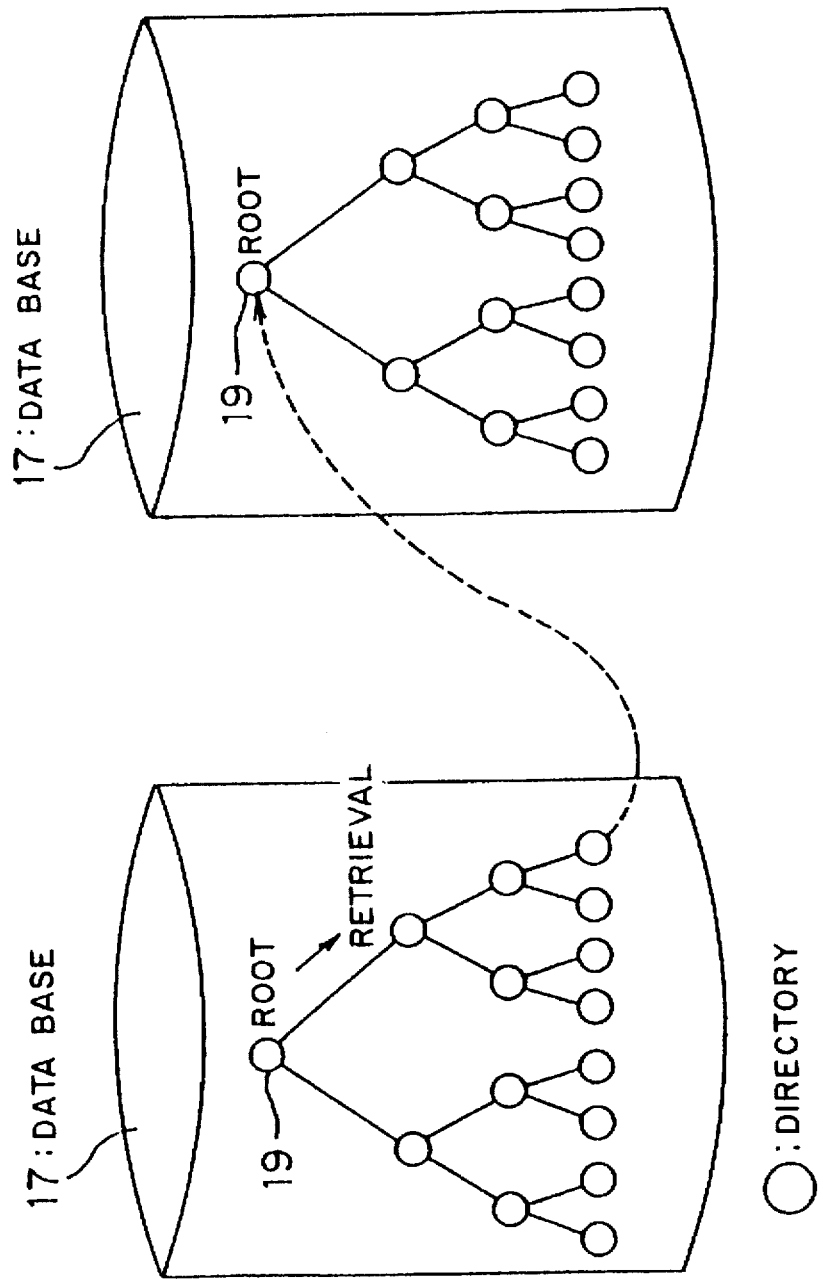
FIG. 27 is a diagrammatic view illustrating a retrieval method which employs distributed directory data bases.

Subsequently, comparison between the processing wherein the service control program means 2-1 is moved, upon movement of a terminal used by a user, to another service control apparatus which controls the thus moved terminal as described above and the processing wherein the service control program means 2-1 is not moved even if a terminal used by a user moves as described hereinabove in connection with the first embodiment will be described briefly by way of comparison between FIGS. 23 and 24. It is to be noted that service control program means 2-1 and resource control program means (SC1 and SC2) 2-2 shown in FIGS. 23 and 24 are similar to those described hereinabove with reference to FIG. 18, and directory control program means (DM1 and DM2) 2-3 and 2'-3 are similar to those described hereinabove with reference to FIG. 19. Further, resource control program means (Rsc.mng: resource manager) 2-2A controls a portable terminal (T1) 103, and resource control program means 2-2B and 2-2C control performance of a service to a fixed telephone set (T2) 104 and a portable telephone set (T3) 105 by way of exchanges 106 and 107, respectively.

For example, when a user 102 wants to originate a call from its portable terminal 103 to another portable terminal 103 of another user 101 in order to enable a service between the user 101 and the user 102, when the user 101 (user A) whose portable terminal (PDA) 103 is registered is present in an area (Area 1) which is controlled by the directory control program means 2-3, if the user 102 (user B) who is in another area (Area 2) which is controlled by the directory control program means 2'-3 originates a call to the user 101 using the portable telephone set 105, the request to send is transferred by way of a resource control program of the exchange 107 to the service control program means 2'-1 by which the user 102 is controlled (step C1).

Then, the service control program means 2'-1 transmits a connection request of speech from the portable telephone set 105 to the service control program means 2-1 by which the user 101 is controlled (step C2). The service control program means 2-1 thus checks that the portable terminal 103 which is registered in the area (Area 1) which is controlled by the service control program means 2-1 cannot receive the call of speech and further checks from the area directory of the directory control program means 2-3 that the fixed telephone set 104 in a free condition is present in the area (Area 1) in which the user 101 is present (steps C3 to C5).

Then, the service control program means 2-1 transmits a guidance outputting request to the portable terminal 103 to respond by way of an available telephone set nearby (step C6). If the user 101 responds to the guidance outputting request, then the service control program means 2-1 transmits a connection request between the fixed telephone set 104 and the portable telephone set 105 to the directory control program means 2-3. In accordance with the connection request, the directory control program means 2-3 connects a channel between the exchange 106 and the exchange 107 by way of the resource control program means 2-2B.

As a result, the user 101 can respond to the call originated from the user 102 using a non-registered terminal (portable telephone set 105) at a location after movement.

Accordingly, although the user 101 moves to the area (Area 1) spaced away from the service control program means 2-1 as shown in FIG. 24, the number of control messages to be transferred between the service control apparatus 2 and 2', which may otherwise increase when processing similar to that at steps C3 to C5 described hereinabove without moving the service control program means 2-1, can be reduced remarkably. Consequently, even when a user moves, a personal communication service can be performed at a high speed.

The present invention is not limited to the specifically described embodiment, and variations and modifications may be made without departing from the scope of the present invention.

What is claimed is:

1. A personal communication service distributed control system for a communication system wherein when a user initiates a communication, a personal identification information service defined for each user is performed using personal identification information that provides identification of the user, comprising:

a plurality of hardware resources constituting a physical network; and a plurality of service control apparatus connected to said hardware resources;

each of said service control apparatuses including a plurality of service control program means for controlling said physical network independently of each other for individual pieces of personal identification information, resources control program means for controlling said hardware resources present discretely in said physical network, and directory management program means including a distributed directory for uniquely identifying said service control program means, said resource control program means and said hardware resources, said distributed directory having a data structure wherein objects of a plurality of directories are linked by pointers and each of the objects has position information of the other objects and address information for transferring a control signal, said directory management program means further including transfer destination retrieval function means and transfer function means for a control signal so that reference is made to said distributed directory to perform retrieval for a transfer destination and routing for the control signal simultaneously.

2. A personal communication service distributed control system as claimed in claim 1, wherein said distributed directory is constructed using a home directory for holding position information of said service control program means or said resource control program means and an alias directory for holding information of a connection relationship of the divided directory.

3. A personal communication service distributed control system as claimed in claim 2, wherein said directory management program means of said service control apparatus includes a correspondence table between home directory names of said service control program means and said resource control program means present in the same service control apparatus and position information of the directories, and means operable when a request for transfer of a message for communication between programs is received for causing said directory management program means to refer to said correspondence table and perform high speed communication between programs without performing directory retrieval from a root of the directory to the home directory when a reception side address coincides with a name of a home directory of said service control program means or said resource control program means or includes an abbreviation mark representative of a transmission side home directory.

4. A personal communication service distributed control system as claimed in claim 2, wherein a home directory of said directory management program means of said service control apparatus has a storage area for a current directory name which indicates a start point of retrieval and a storage area for position information of the current directory, and means operable when an abbreviation mark representative of said current directory is included in a designation of a reception side address for communication between programs for causing said directory management program means to refer to a correspondence table of said home directory and the position information of said current directory and perform high speed communication between the programs without performing directory retrieval from a root of the directory to said current directory.

5. A personal communication service distributed control system as claimed in claim 2, wherein said directory management program means has a storage area provided in each of objects thereof for storing information of an event notification requirement in order to realize notification reservation of an object state variation event to the object and has a storage area provided in a home directory of the object for storing a correspondence table between an event notification destination home directory name and position information of the event notification destination home directory, and includes means for referring to the notification requirement of the object and the correspondence table and performing notification of the event after the state of the object is updated.

6. A personal communication service distributed control system as claimed in claim 2, wherein, in order to realize reservation of notification of an object state variation event to all of objects present under a particular directory in said directory management program means, each of the directories of said directory management program means has a storage area for storing information of an event notification requirement and a home directory above the directory or a root directory has a storage area for storing a correspondence table between names and position information of event notification destination home directories, and said directory management program means includes means for referring to the home directory of the object, the notification requirements of the root directory and the correspondence table and performing notification of the event after the state of the object is updated.

7. A personal communication service distributed control system as claimed in claim 1, wherein each of said service control program means includes a personal identification information directory for allowing another piece of personal identification information of the user to be defined newly, and means for using a directory name of the re-defined personal identification information for a reception side address for communication between programs to allow said directory management program means to perform routing of the control signal without retrieving said distributed directory.

8. A personal communication service distributed control system as claimed in claim 1, wherein said directory management program means includes an object as a storage area for storing states of communication terminals which can access said hardware resources, a directory for identification names peculiar to said communication terminals, and a directory for areas in which said communication terminals are present, and each of said service control program means has a storage area for storing a list of the peculiar identification names of the terminals used by the user, and includes means for causing management of the position of any of said communication terminals to be performed by variation of an area directory in said directory management program means and causing the corresponding service control program means to perform control of registration of the terminal of the user to perform management of the positions of different types of communication terminals and registration control of the user.

9. A personal communication service distributed control system for a communication system wherein when a user initiates a communication, a personal identification information service defined for each user is performed using personal identification information that provides identification of the user, comprising:

a plurality of hardware resources constituting a physical network; and a plurality of service control apparatuses connected to said hardware resources;

each of said service control apparatuses including a plurality of service control program means for controlling said physical network independently of each other for individual pieces of personal identification information, resource control program means for controlling said hardware resources present discretely in said physical network, and directory management program means including a distributed directory for uniquely identifying said service control program means, said resource control program means and said hardware resources, said distributed directory having a data structure wherein objects of a plurality of directories are linked by pointers and each of the objects has position information of the other objects and address information for transferring a control signal, said directory management program means further including transfer destination retrieval function means and transfer function means for a control signal so that reference is made to said distributed directory to perform retrieval for a transfer destination of and routing for the control signal simultaneously, said distributed directory including a personal identification information directory for identifying the service control program means for the individual users, a resource directory for identifying said hardware resources, an area directory for identifying physical positions of the users and said hardware resources, and movement management means operable when a user or a communication terminal which can access any of said hardware resources moves for varying said area directory and moving said service control program means of the user or the communication terminal.

10. A personal communication service distributed control system as claimed in claim 9, wherein said service control program means includes a memory for storing an area directory name representative of a position of the service control program means after its movement and successively updates said memory, said service control program means using a relative address of said area directory when said service control program means tries to get information of the area directory or transmit a control signal to an object as a storage area for storing a state of the communication terminal.

11. A personal communication service distributed control system as claimed in claim 10, wherein the copy of the home object of said resource control program means which are referred to by both of said area directory and a cache area is constructed as a common memory.

12. A personal communication service distributed control system as claimed in claim 9, wherein said area directory of said directory management program means has a copy of a home object as a storage area for storing a physical position of said service control program means, and said resource control program means uses a relative address of said area directory when said resource control program means transmits a control signal to said service control program means.

13. A personal communication service distributed control system as claimed in claim 12, wherein the copy of the home object of said resource control program means which are referred to by both of said area directory and a cache area is constructed as a common memory.

14. A personal communication service distributed control system as claimed in claim 9, wherein said personal identification information directory in said directory management program means has a cache area serving as a memory for storing data of the personal identification information of the service control apparatus, and means for moving, when the service control program means moves between different ones of said service control apparatus, the personal identification information and a copy of the home object of the service control program means between the control nodes into said cache area and for preferentially retrieving said directory cache when a control signal is to be transmitted between the service control program means.

15. A personal communication service distributed control system as claimed in claim 9, wherein the copy of the home object of said resource control program means which are referred to by both of said area directory and a cache area is constructed as a common memory.

16. A personal communication service distributed control system as claimed in claim 9, wherein each of said service control program means has a movement permission information storage area for setting permission or inhibition of movement of the service control program means in advance, and the service control apparatus determines permission or inhibition of movement of the service control program means based on the setting in said movement permission information storage area.

17. A personal communication service distributed control system as claimed in claim 9, wherein each of said service control program means has a movement delay time setting section and movement of said service control program means is delayed based on the setting of said movement delay time setting section.

18. A service control apparatus for a personal communication service distributed control system connected to a plurality of hardware resources constituting a physical network for performing a personal identification information service defined for each user using personal identification information that provides identification of the user, comprising:
 a plurality of service control program means for controlling said physical network independently of each other for the individual pieces of personal identification information;
 resource control program means for controlling said hardware resources present discretely in said physical network; and
 directory management program means including a distributed directory for uniquely identifying said service control program means, said resource control program means and said hardware resources, said distributed directory having a data structure wherein objects of a plurality of directories are linked by pointers and each of the objects has position information of the other objects and address information for transferring a control signal, said directory management program means further including transfer destination retrieval function means and transfer function means for a control signal so that said distributed directory to perform retrieval for a transfer destination and routing for the control signal simultaneously.

19. A service control apparatus for personal communication service distributed control system as claimed in claim 18, wherein said distributed directory is constructed using a home directory for holding position information of said service control program means or said resource control program means and an alias directory for holding information of a connection relationship of the divided directory.

20. A service control apparatus for a personal communication service distributed control system as claimed in claim 19, wherein said directory management program means of said service control apparatus includes a correspondence table between home directory names of said service control program means and said resource control program means present in the same service control apparatus and position information of the directories, and means operable when a request for transfer of a message for communication between programs is received for causing said directory management program means to refer to said correspondence table and perform high speed communication between programs without performing directory retrieval from a root of the directory to the home directory when a reception side address coincides with a name of a home directory of said service control program means or said resource control program means or includes an abbreviation mark representative of a transmission side home directory.

21. A service control apparatus for a personal communication service distributed control system as claimed in claim 19, wherein a home directory of said directory management program means of said service control apparatus has a storage area for a current directory name which indicates a start point of retrieval and a storage area for position information of the current directory, and means operable when an abbreviation mark representative of said current directory is included in a designation of a reception side address for communication between programs for causing said directory management program means to refer to a correspondence table of said home directory and the position information of said current directory and perform high speed communication between the programs without performing directory retrieval from a root of the directory to said current directory.

22. A service control apparatus for a personal communication service distributed control system as claimed in claim 19, wherein said directory management program means has a storage area provided in each of objects thereof for storing information of an event notification requirement in order to realize notification reservation of an object state variation event to the object and has a storage area provided in a home directory of the object for storing a correspondence table between an event notification destination home directory name and position information of the event notification destination home directory, and includes means for referring to the notification requirement of the object and the correspondence table and performing notification of the event after the state of the object is updated.

23. A service control apparatus for a personal communication service distributed control system as claimed in claim 19, wherein, in order to realize reservation of notification of an object state variation event to all of objects present under a particular directory in said directory management program means, each of the directories of said directory management program means has a storage area for storing information of an event notification requirement and a home directory above the directory or a root directory has a storage area for storing a correspondence table between names and position information of event notification destination home directories, and said directory management program means includes means for referring to the home directory of the object, the notification requirements of the root directory and the correspondence table and performing notification of the event after the state of the object is updated.

24. A service control apparatus for a personal communication service distributed control system as claimed in claim 18, wherein each of said service control program means includes a personal identification information directory for allowing another piece of personal identification information of the user to be defined newly, and means for using a directory name of the re-defined personal identification information for a reception side address for communication between programs to allow said directory management program means to perform routing of the control signal without retrieving said distributed directory.

25. A service control apparatus for a personal communication service distributed control system as claimed in claim 18, wherein said directory management program means includes an object as a storage area for storing states of communication terminals which can access said hardware resources, a directory for identification names peculiar to said communication terminals, and a directory for areas in which said communication terminals are present, and each of said service control program means has a storage area for storing a list of the peculiar identification names of the terminals used by the user, and includes means for causing management of the position of any of said communication terminals to be performed by variation of an area directory in said directory management program means and causing the corresponding service control program means to perform control of registration of the terminal of the user to perform management of the positions of different types of communication terminals and registration control of the user.

26. A service control apparatus for a personal communication service distributed control system connected to a plurality of hardware resources constituting a physical network for performing a personal identification information service defined for each user using personal identification information that provided identification of the user, comprising:

a plurality of service control program means for controlling said physical network independently of each other for individual pieces of personal identification information;

resource control program means for controlling said hardware resources present discretely in said physical network; and directory management program means including a distributed directory for uniquely identifying said service control program means, said resource control program means and said hardware resources, said distributed directory having a data structure wherein objects of a plurality of directories are linked by pointers and each of the objects has position information of the other objects and address information for transferring a control signal, said directory management program means further including transfer destination retrieval function means and transfer function means for a control signal so that reference is made to said distributed directory to perform retrieval for a transfer destination and routing for the control signal simultaneously;

said distributed directory including a personal identification information directory for identifying the service control program means for the individual users, a resource directory for identifying said hardware resources, an area directory for identifying physical positions of the users and said hardware resources, and movement management means operable when a user or a communication terminal which can access any of said hardware resources moves for varying said area directory and moving said service control program means of the user or the communication terminal.

27. A service control apparatus for a personal communication service distributed control system as claimed in claim 26, wherein said service control program means includes a memory for storing an area directory name representative of a position of the service control program means after its movement and successively updates said memory, said service control program means using a relative address of said area directory when said service control program means tries to get information of the area directory or transmit a control signal to an object as a storage area for storing a state of the communication terminal.

28. A service control apparatus for a personal communication service distributed control system as claimed in claim 27, wherein the copy of the home object of said resource control program means which are referred to by both of said area directory and a cache area is constructed as a common memory.

29. A service control apparatus for a personal communication service distributed control system as claimed in claim 26, wherein said area directory of said directory management program means has a copy of a home object as a storage area for storing a physical position of said service control program means, and said resource control program means uses a relative address of said area directory when said resource control program means transmits a control signal to said service control program means.

30. A service control apparatus for a personal communication service distributed control system as claimed in claim 29, wherein the copy of the home object of said resource control program means which are referred to by both of said area directory and a cache area is constructed as a common memory.

31. A service control apparatus for a personal communication service distributed control system as claimed in claim 26, wherein said personal identification information directory in said directory management program means has a cache area serving as a memory for storing data of a personal identification information of the service control apparatus, and means for moving, when the service control program means moves between different ones of said service control apparatus, the personal identification information and a copy of the home object of the service control program means between the control nodes into said cache area and for preferentially retrieving said directory cache when a control signal is to be transmitted between the service control program means.

32. A service control apparatus for a personal communication service distributed control system as claimed in claim 26, wherein the copy of the home object of said resource control program means which are referred to by both of said area directory and a cache area is constructed as a common memory.

33. A service control apparatus for a personal communication service distributed control system as claimed in claim 26, wherein each of said service control program means has a movement permission information storage area for setting permission or inhibition of movement of the service control program means in advance, and the service control apparatus determines permission or inhibition of movement of the service control program means based on the setting in said movement permission information storage area.

34. A service control apparatus for a personal communication service distributed control system as claimed in claim 26, wherein each of said service control program means has a movement delay time setting section and movement of said service control program means is delayed based on the setting of said movement delay time setting section.

* * * * *